(12) United States Patent
Gulati et al.

(10) Patent No.: US 11,411,796 B1
(45) Date of Patent: Aug. 9, 2022

(54) BIT INTERLEAVING FOR BITWISE AUTOENCODER BASED COMMUNICATIONS

(71) Applicant: QUALCOMM Incorporated, San Diego, CA (US)

(72) Inventors: Kapil Gulati, Belle Mead, NJ (US); June Namgoong, San Diego, CA (US); Taesang Yoo, San Diego, CA (US); Aaron Klein, Highland Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/186,844

(22) Filed: Feb. 26, 2021

(51) Int. Cl.
*H04L 27/34* (2006.01)
*H04L 25/02* (2006.01)
*H04L 1/00* (2006.01)

(52) U.S. Cl.
CPC ........ *H04L 27/3483* (2013.01); *H04L 1/0071* (2013.01); *H04L 25/0254* (2013.01)

(58) Field of Classification Search
CPC  H04L 27/3483; H04L 1/0071; H04L 25/0254
See application file for complete search history.

(56) References Cited

U.S. PATENT DOCUMENTS

| 11,082,149 B2 * | 8/2021 | Hoydis | G06N 3/02 |
| 2021/0250143 A1 * | 8/2021 | Lee | H04W 24/10 |

OTHER PUBLICATIONS

S. Cammerer, F. A. Aoudia, S. Dörner, M. Stark, J. Hoydis and S. ten Brink, "Trainable Communication Systems: Concepts and Prototype," in IEEE Transactions on Communications, vol. 68, No. 9, pp. 5489-5503, Sep. 2020.

* cited by examiner

*Primary Examiner* — Nader Bolourchi
(74) *Attorney, Agent, or Firm* — Harrity & Harrity LLP/Qualcomm Incorporated

(57) ABSTRACT

Various aspects of the present disclosure generally relate to wireless communication. In some aspects, a wireless communication device (WCD) may train a bitwise autoencoder neural network to obtain a constellation mapping. The WCD may determine a bit position ordering for bit positions of modulated symbols associated with the constellation mapping based at least in part on error protection levels of bit positions associated with the constellation mapping. The WCD may perform bit interleaving for one or more coded bits of a communication, based at least in part on the bit position ordering of the constellation mapping, to obtain one or more interleaved bits. The WCD may generate one or more modulated symbols for the communication by mapping the one or more interleaved bits using the constellation mapping. The WCD may transmit, to a receiver device, the one or more modulated symbols for the communication. Numerous other aspects are described.

30 Claims, 13 Drawing Sheets

BIT INTERLEAVING FOR BITWISE AUTOENCODER BASED COMMUNICATIONS

FIELD OF THE DISCLOSURE

Aspects of the present disclosure generally relate to wireless communication and to techniques and apparatuses for bit interleaving for bitwise autoencoder based communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a wireless communication device for wireless communication includes a memory and one or more processors operatively coupled to the memory. The memory and the one or more processors may be configured to: train a bitwise autoencoder neural network to obtain a constellation mapping to be used for mapping coded bits to modulated symbols; determine a bit position ordering for bit positions of modulated symbols associated with the constellation mapping based at least in part on error protection levels of bit positions associated with the constellation mapping; perform bit interleaving for one or more coded bits of a communication, based at least in part on the bit position ordering of the constellation mapping, to obtain one or more interleaved bits; generate one or more modulated symbols for the communication by mapping the one or more interleaved bits using the constellation mapping; and transmit, to a receiver device, the one or more modulated symbols for the communication.

In some aspects, a method of wireless communication performed by a wireless communication device includes training a bitwise autoencoder neural network to obtain a constellation mapping to be used for mapping coded bits to modulated symbols; determining a bit position ordering for bit positions of modulated symbols associated with the constellation mapping based at least in part on error protection levels of bit positions associated with the constellation mapping; performing bit interleaving for one or more coded bits of a communication, based at least in part on the bit position ordering of the constellation mapping, to obtain one or more interleaved bits; generating one or more modulated symbols for the communication by mapping the one or more interleaved bits using the constellation mapping; and transmitting, to a receiver device, the one or more modulated symbols for the communication.

In some aspects, a non-transitory computer-readable medium storing a set of instructions for wireless communication includes one or more instructions that, when executed by one or more processors of a wireless communication device, cause the wireless communication device to: train a bitwise autoencoder neural network to obtain a constellation mapping to be used for mapping coded bits to modulated symbols; determine a bit position ordering for bit positions of modulated symbols associated with the constellation mapping based at least in part on error protection levels of bit positions associated with the constellation mapping; perform bit interleaving for one or more coded bits of a communication, based at least in part on the bit position ordering of the constellation mapping, to obtain one or more interleaved bits; generate one or more modulated symbols for the communication by mapping the one or more interleaved bits using the constellation mapping; and transmit, to a receiver device, the one or more modulated symbols for the communication.

In some aspects, an apparatus for wireless communication includes means for training a bitwise autoencoder neural network to obtain a constellation mapping to be used for mapping coded bits to modulated symbols; means for determining a bit position ordering for bit positions of modulated symbols associated with the constellation mapping based at least in part on error protection levels of bit positions associated with the constellation mapping; means for performing bit interleaving for one or more coded bits of a communication, based at least in part on the bit position ordering of the constellation mapping, to obtain one or more interleaved bits; means for generating one or more modulated symbols for the communication by mapping the one or more interleaved bits using the constellation mapping; and means for transmitting, to a receiver device, the one or more modulated symbols for the communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
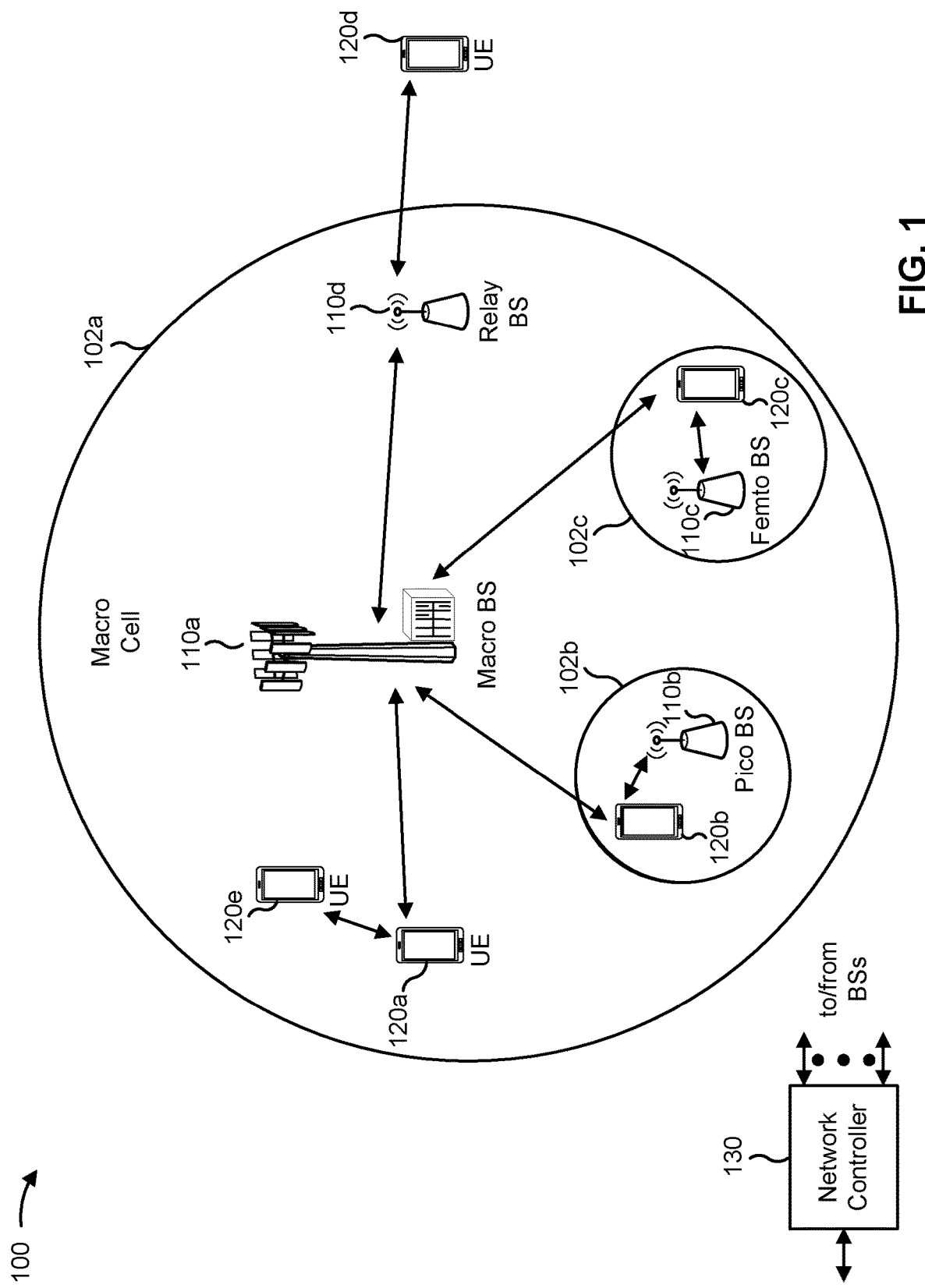
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
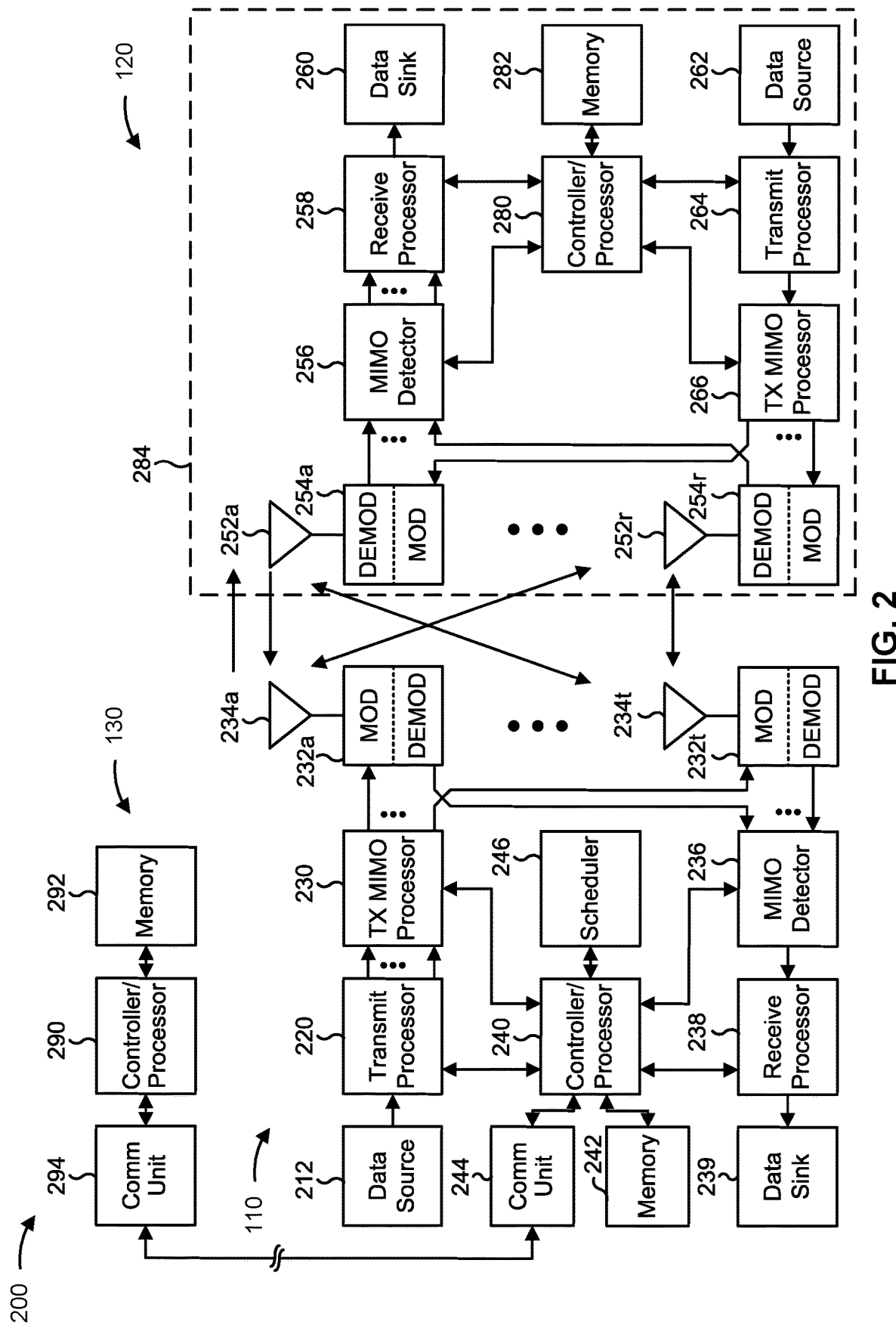
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6A, 6B, and 7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6A, 6B, and 7.

Controller/processor 240 of base station 110, controller/processor 280 of UE 120, and/or any other component(s) of FIG. 2 may perform one or more techniques associated with bit interleaving for bitwise autoencoder based communications, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2.

Figure 7:
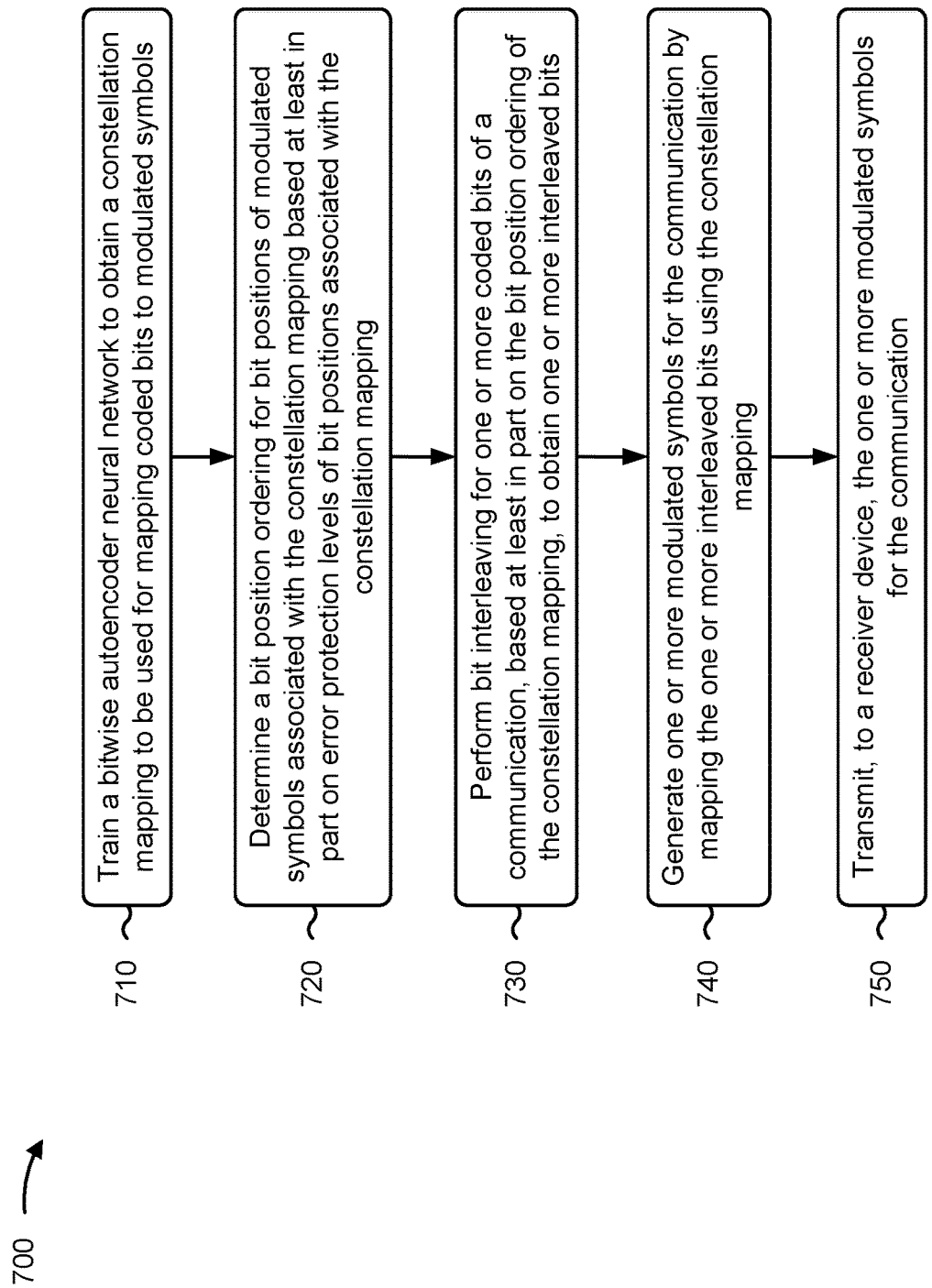
FIG. 7 is a diagram illustrating an example process associated with bit interleaving for bitwise autoencoder based communications, in accordance with the present disclosure.

For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, and/or interpreting the instructions, among other examples.

In some aspects, the wireless communication device includes means for training a bitwise autoencoder neural network to obtain a constellation mapping to be used for mapping coded bits to modulated symbols; means for determining a bit position ordering for bit positions of modulated symbols associated with the constellation mapping based at least in part on error protection levels of bit positions associated with the constellation mapping; means for performing bit interleaving for one or more coded bits of a communication, based at least in part on the bit position ordering of the constellation mapping, to obtain one or more interleaved bits; means for generating one or more modulated symbols for the communication by mapping the one or more interleaved bits using the constellation mapping; and/or means for transmitting, to a receiver device, the one or more modulated symbols for the communication. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, and/or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, and/or memory 282.

In some aspects, the wireless communication device includes means for training the bitwise autoencoder neural network to obtain the constellation mapping based at least in part on at least one of: a modulation order, a code rate, an operating signal-to-noise ratio (SNR), an SNR range associated with the operating SNR, or a combination thereof.

In some aspects, the wireless communication device includes means for determining, for a bit position, a distance measurement between one or more pairs of constellation points in the constellation mapping for the bit position; means for determining, for the bit position, an error protection level for the bit position based at least in part on the distance measurement; means for determining, for each bit position for modulated symbols associated with the constellation mapping, an error protection level; and/or means for determining the bit position ordering based at least in part on comparing the error protection levels for each bit position.

In some aspects, the wireless communication device includes means for determining to order the bit positions from a lowest error protection level to a highest error protection level or from a highest error protection level to a lowest error protection level based at least in part on a configuration of the wireless communication device.

In some aspects, the wireless communication device includes means for transmitting, to the receiver device, an indication of at least one of: whether the wireless communication device is to perform the bit interleaving that is based at least in part on the bit position ordering of the constellation mapping, the bit position ordering of the constellation mapping, or a combination thereof.

In some aspects, the wireless communication device includes means for transmitting, to the receiver device, the indication via at least one of: a control message that schedules the communication, a semi-static configuration, a demapping configuration associated with the bitwise autoencoder neural network, an indication of a bitwise autoencoder neural network for the receiver device, or a combination thereof.

In some aspects, the wireless communication device includes means for determining a difference between error protection levels for each bit position for modulated symbols associated with the constellation mapping; means for determining whether the difference satisfies a threshold; and/or means for performing the bit interleaving for the one or more coded bits of the communication if the difference satisfies the threshold.

In some aspects, the wireless communication device includes means for determining that a first error protection level for a first bit position is the same as or within a threshold amount of a second error protection level for a second bit position; and/or means for determining a bit position ordering for the first bit position and the second bit position based at least in part on a default position of the first bit position and a default position of the second bit position within modulated symbols associated with the constellation mapping.

In some aspects, the wireless communication device includes means for performing the bit interleaving to map a first type of coded bit of the one or more coded bits into bit positions having higher error protection levels according to the bit position ordering, wherein the first type of coded bit is associated with a greater importance for data recovery at the receiver device than a second type of coded bit.

In some aspects, the wireless communication device includes means for inputting the one or more coded bits into a matrix that includes one or more rows, wherein the number of one or more rows is equal to a modulation order associated with the constellation mapping; means for ordering the one or more rows based at least in part on the bit position ordering; and/or means for obtaining a vector of interleaved coded bits based at least in part on coded bits included each column of the matrix.

In some aspects, the wireless communication device includes means for determining a difference between error protection levels for each bit position for modulated symbols associated with the constellation mapping; means for determining that the difference satisfies a modulation order threshold; means for selecting an updated modulation order for the communication based at least in part on the difference satisfying the modulation order threshold, wherein the updated modulation order is a lower modulation order than a modulation order associated with the constellation mapping; and/or means for transmitting one or more modulated symbols for the communication that have the updated modulation order.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
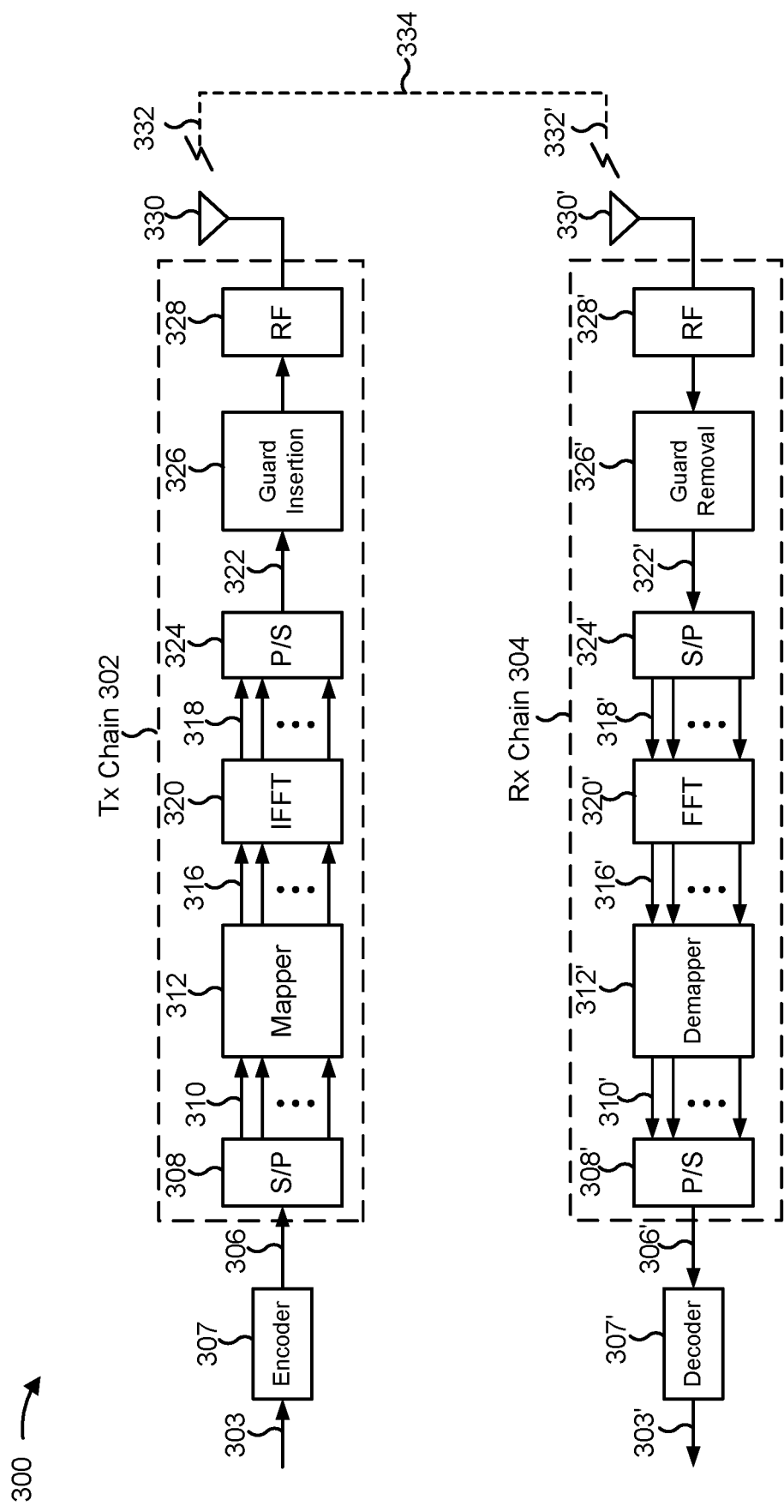
FIG. 3 is a diagram illustrating an example of a transmit (Tx) chain and a receive (Rx) chain of a UE, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of Tx chain 302 may be implemented in transmit processor 264, TX MIMO processor 266, MOD/DEMOD 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), among other examples. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, MOD/DEMOD 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

FIGS. 4A-4D are diagrams illustrating an example 400 of autoencoder neural networks for obtaining constellations, in accordance with the present disclosure. An autoencoder may use a neural network to encode communications. For example, the autoencoder may use an encoder network (e.g., a neural network at a Tx device) to encode an input into an encoded message, and a decoder may use a decoder network (e.g., a neural network at a Tx device) to decode the encoded message and approximately reconstruct the input. The encoder network and the decoder network may be trained jointly. One advantage of this approach is that autoencoders may not require knowledge of the underlying data distribution of the input or an explicit identification of a structure of the input. In some aspects, an autoencoder may use a neural network to obtain a modulation constellation mapping that is best suited for transmitting a set of coded bits (e.g., based on channel conditions, such as SNR, a code rate, a target SNR range, and/or a modulation order). This may improve communication performance when compared to using fixed modulation constellations, such as BPSK, QPSK, 8PSK, and/or QAM, among other examples (e.g., that do not take into account SNR, a code rate, a target SNR range, and/or a modulation order for coded bits to be transmitted).

Figure 4A:
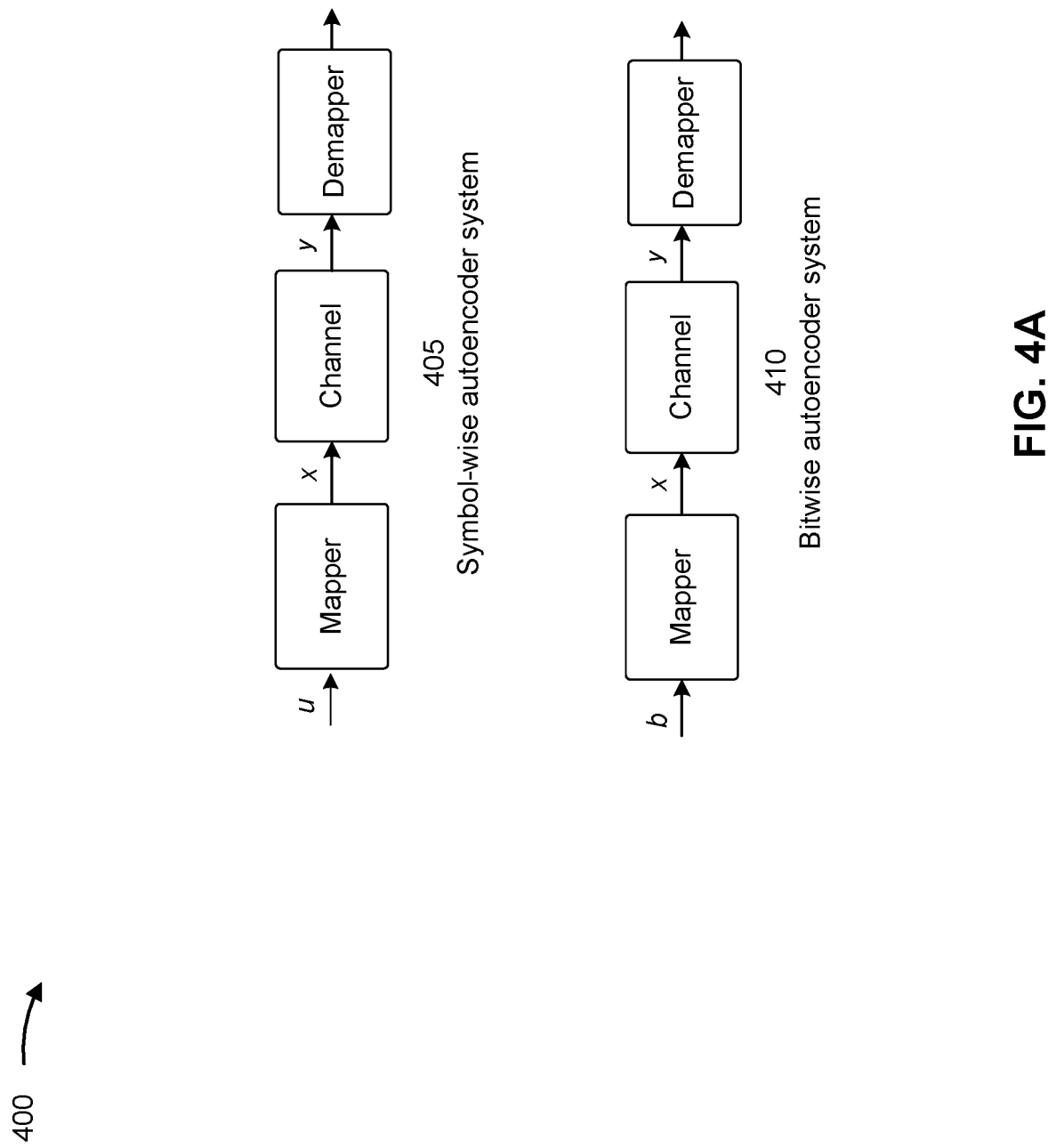
FIGS. 4A-4D are diagrams illustrating an example of autoencoder neural networks for obtaining constellations, in accordance with the present disclosure.

As shown in FIG. 4A, and by reference number 405, a wireless communication device may include a symbol-wise autoencoder system. A symbol-wise autoencoder system may aim to minimize a symbol error rate for modulated symbols to be transmitted by a Tx device. For example, a symbol-wise autoencoder system may aim to optimize a categorical cross entropy (CE) for modulated symbols transmitted using the symbol-wise autoencoder system (e.g., may aim to optimize a categorical CE between an input to the symbol-wise autoencoder system at a Tx device and an output of the symbol-wise autoencoder system at an Rx device). For example, the symbol-wise autoencoder system may attempt to maximize mutual information (e.g., for symbols) between channel input (e.g., at the Tx device) and channel output (e.g., at the Rx device).

The symbol-wise autoencoder system may be an end-to-end system that includes the Tx device, the channel, and the Rx device. For example, as shown in FIG. 4A, an input to the symbol-wise autoencoder system may be a stream of bits that have not been coded (e.g., shown as u in FIG. 4A). Therefore, a mapper function of the symbol-wise autoencoder system may include an encoding function (e.g., to apply network coding to the stream of bits to obtain a stream of coded bits). Similarly, the demapper function may include a decoding function (e.g., to decode the coded bits and approximately reconstruct the input). The mapper function may train the autoencoder neural network to obtain (e.g., learn) one or more constellations. However, in some communication systems, Rx devices rely on bit interleaved coded modulation (BICM) techniques. BICM techniques may include bit-metric decoding (BMD) at the Rx device. BMD may include labelling the points forming the channel input constellation by bit vectors. Therefore, BMD may treat bit levels independently (e.g., multi-level encoding and decoding may not be performed in BICM communication systems). As a result, a symbol-wise autoencoder system must label obtained (e.g., learned) constellations by bit vectors in order for the constellation to be used in a BICM communication system. However, labelling the obtained (e.g., learned) constellations by bit vectors is a processing intensive task. Moreover, obtained (e.g., learned) constellations, using the symbol-wise autoencoder system, at an Rx device that uses BMD are suboptimal. For example, obtained (e.g., learned) constellations, using the symbol-wise autoencoder system, at an Rx device that uses BMD may not be sufficient for achieving an intended bit rate for the BMD Rx device (e.g., mutual information between a channel input and output may not be rate achievable by the BMD Rx device).

As shown by reference number 410, a bitwise autoencoder system is depicted. A bitwise autoencoder system may be designed to minimize a bit error rate (BER), rather than the symbol error rate described above in connection with the symbol-wise autoencoder system. The bitwise autoencoder system may consider (e.g., be trained using) bitwise mutual information (BMI) (e.g., rather than the mutual information between channel input and output). For example, an input to the bitwise autoencoder system may include a stream of coded bits (e.g., shown by b in FIG. 4A). By training the bitwise autoencoder system using BMI, obtained (e.g., learned) constellations, using the bitwise autoencoder system, at an Rx device that uses BMD may be sufficient for achieving an intended bit rate for the BMD Rx device. That is, the BMI may be rate achievable for BMD. As a result, it may be desirable to use a bitwise autoencoder in a communication system that uses BICM and/or BMD to ensure that intended bit rates of communications can be achieved or met.

Figure 4B:
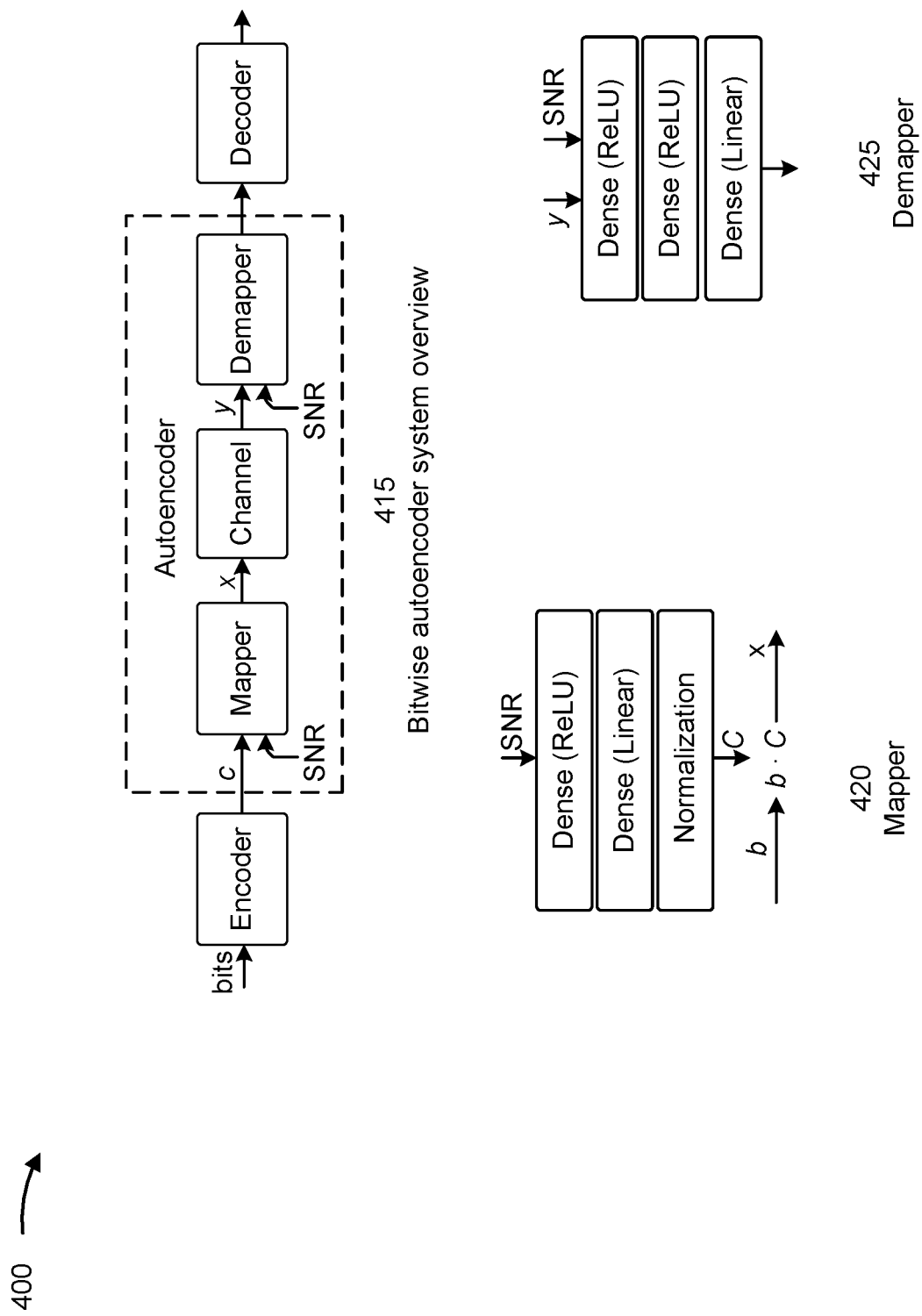

As shown in FIG. 4B, and by reference number 415, a bitwise autoencoder system may not include an encoder (e.g., at a Tx device) and/or a decoder (e.g., at an Rx device). For example, an input to the bitwise autoencoder system may be a stream of coded bits (e.g., shown by c in FIG. 4B). An encoder of the Tx device may perform network coding for a stream of information bits to generate the coded bits. The network coding may include low density parity check (LDPC) network coding, fountain coding, linear network coding, random linear network coding, Luby transform (LT) network coding, and/or Raptor network coding, among other examples. A decoder of the Rx device may decode the received bits to approximately reconstruct the input. By training the bitwise autoencoder without the encoder and decoder functionality, an overhead and complexity associated with training the bitwise autoencoder is significantly reduced. For example, if the encoder and decoder functionality were to be included in the training of the bitwise autoencoder, then a training set may include significantly more data points (e.g., to train for all possible codewords).

As shown by reference number 420, an example neural network for a mapper of the bitwise autoencoder is depicted. The neural network may be a convolutional neural network and/or a deep feedforward neural network, among other examples. As shown in FIG. 4B, the mapper neural network may obtain an input of a target operating SNR and/or a range of operating SNRs (e.g., around the target operating SNR) for the channel. The neural network may generate a set of modulation constellations that are optimized for a modulation order and a target operating SNR (e.g., and/or a range of operating SNRs). The mapper neural network may include one or more layers. For example, as shown in FIG. 4B, the mapper neural network may include three layers. The mapper neural network may include two dense layers, where a first dense layer uses rectified linear unit (ReLU) activations and a second dense layer uses linear activations. The third layer of the neural network may be a normalization layer to ensure that a power constraint on the output is met. As shown in FIG. 4B, the mapper neural network may generate or learn a constellation mapping (shown as C in FIG. 4B) that is optimized for a modulation order and a target operating SNR (e.g., and/or a range of operating SNRs). The mapper may map a coded bit vector (e.g., shown as b in FIG. 4B) to a constellation point, x, of the constellation mapping to generate a modulated symbol.

As shown by reference number 425, an example neural network for a demapper of the bitwise autoencoder is depicted. As explained above, the neural network for the demapper may be trained jointly with the neural network for the mapper to obtain (e.g., learn) a set of optimized modulation constellation mappings. As shown in FIG. 4B, the demapper neural network may obtain an input of a target operating SNR and/or a range of operating SNRs (e.g., around the target operating SNR) for the channel and a received symbol (e.g., shown as y in FIG. 4B) from the channel. The demapper neural network may obtain (e.g., learn) a modulation constellation that is optimized for a modulation order and a target operating SNR (e.g., and/or a range of operating SNRs). The demapper neural network may include one or more layers. For example, as shown in FIG. 4B, the demapper neural network may include three dense layers. The mapper neural network may include two dense layers that use ReLU activations and a third dense layer that uses linear activations. The demapper may obtain an estimation of the bit vector input at the mapper by demapping the received signal, y, using the optimized modulation constellation mapping.

Figure 4C:
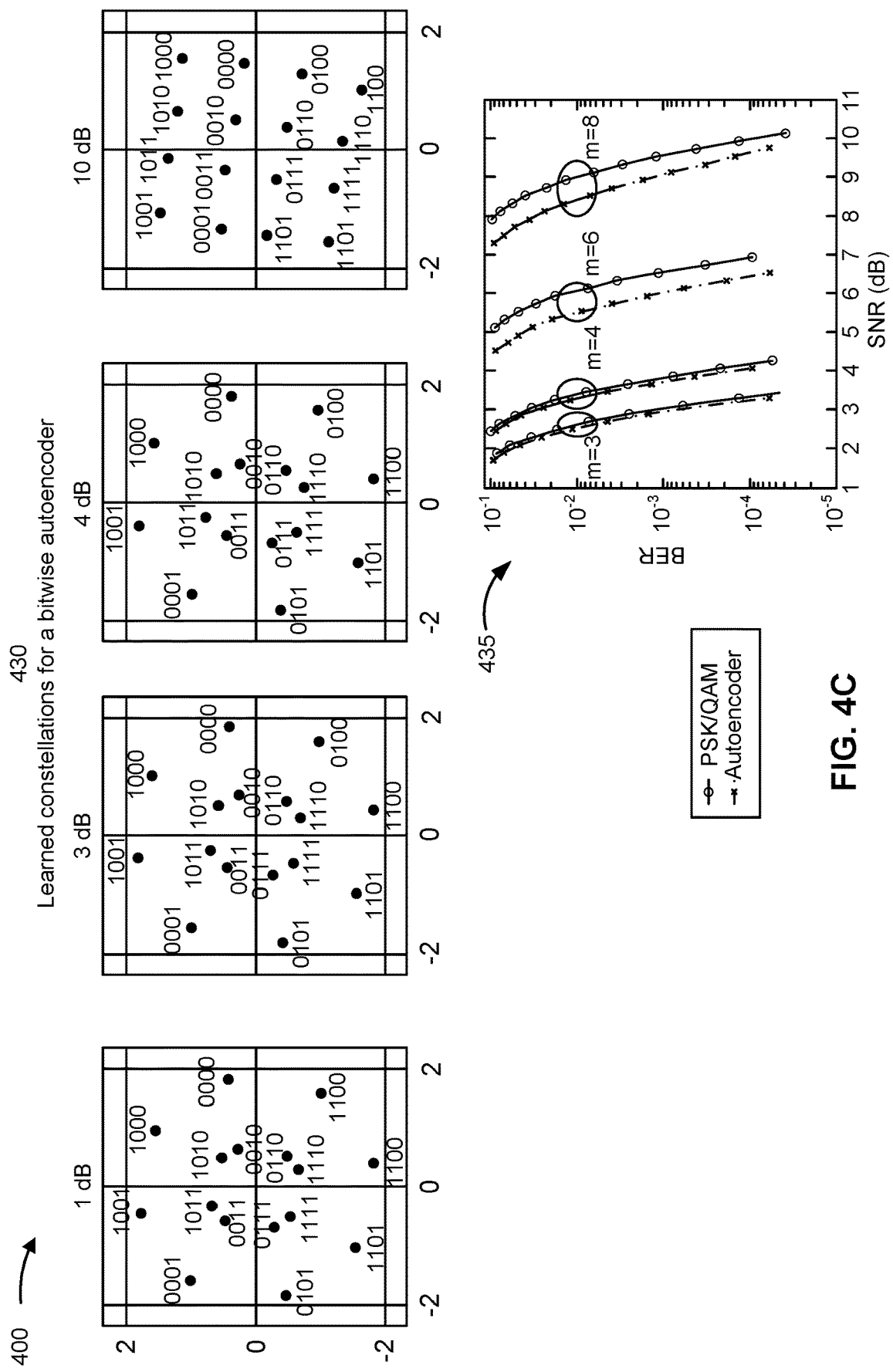

As shown in FIG. 4C, and by reference number 430, a set of learned constellations for a bitwise autoencoder are depicted. The learned constellations shown in FIG. 4C may be associated with a modulation order of 4 (e.g., the modulated symbols may include 4 bits) at varying SNRs (e.g., 1 dB, 3 dB, 4 dB, and 10 dB). As shown in FIG. 4C, the modulation constellations learned by the bitwise autoencoder for the same modulation order may vary significantly for different SNR levels. For example, for an SNR of 10 dB, the modulation constellations learned by the bitwise autoencoder may include constellation points that are relatively equidistant from one another. Therefore, the learned constellation for an SNR of 10 dB may provide relatively equal power for each bit position (e.g., each bit level) of the modulated symbols. Therefore, the learned constellation for an SNR of 10 dB may provide approximately equal error protection levels for each bit position. However, as shown in FIG. 4C, the learned constellations for SNRs of 1 dB, 3 dB, and 4 dB may include constellation points that are not equidistant from one another. For example, the learned constellations for SNRs of 1 dB, 3 dB, and 4 dB may be correlated to two concentric phase shift keying (PSK) constellations. Therefore, the learned constellations for SNRs of 1 dB, 3 dB, and 4 dB may provide more power for one or more bits of a modulated symbol when compared to other bits of the modulated symbol. For example, the learned constellations for SNRs of 1 dB, 3 dB, and 4 dB may include clusters of constellation points that only differ in one bit position. Within each cluster, a reliability of the one bit position that differs may be reduced and a reliability of the other bit positions may be increased. Therefore, although the reliability of one bit position may be decreased, an overall achievable information rate (e.g., bit rate) for a modulated symbol is optimized.

As shown by reference number 435, a graph depicting BER achieved using different constellations over a range of SNRs is shown. As shown in the graph, constellations learned by a bitwise autoencoder outperform (e.g., result in an improved BER) over PSK and/or QAM constellations. For example, for a modulation order (m) of 8, the constellation learned by a bitwise autoencoder results in a 0.8 dB gain in BER compared to a 256QAM constellation. Additionally, for a modulation order of 3, the constellation learned by a bitwise autoencoder results in a 0.3 dB gain in BER compared to an 8PSK constellation.

The clustering, as described above, may occur due to the modulation order for a communication being suboptimal for the channel SNR. For example, below an SNR of 10 dB, the modulation order of 4 may be suboptimal for the channel Therefore, to compensate for the suboptimal SNR, the bitwise autoencoder may learn a modulation constellation mapping that optimizes a BER and/or a bit rate for modulated symbols by providing some bits with more power (e.g., more energy) and other bits with less power (e.g., less energy).

Figure 4D:
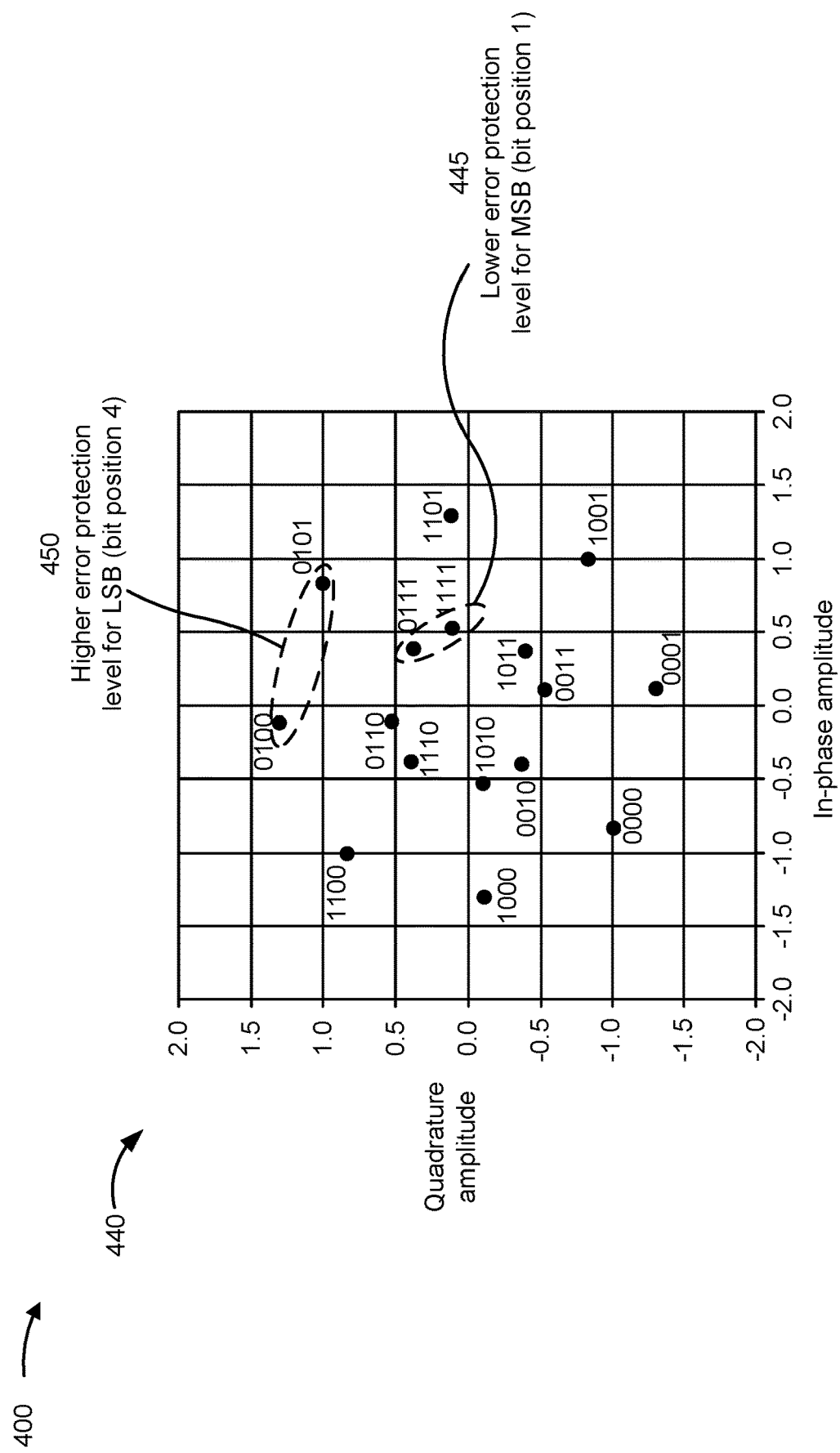

For example, as shown in FIG. 4D, and by reference number 440, a modulation constellation learned by a bitwise autoencoder is shown. The X-axis of the modulation constellation may be an in-phase amplitude for a modulated symbol and the Y-axis may be a Quadrature amplitude for the modulated symbol. The modulation constellation depicted in FIG. 4D may be associated with a modulation order that is suboptimal for a selected SNR. As described above, the bitwise autoencoder neural network may optimize the BER when using a suboptimal modulation order by providing certain bit positions with more energy (e.g., more power) and other bit positions with less energy (e.g., less power). This may result in a lower error protection level for certain bit positions. For example, as shown by reference number 445, a pair of constellation points that differ only in the first bit position are shown (e.g., the first constellation point is for a bit vector of "0111" and the second constellation point is for a bit vector of "1111"). The first constellation point and the second constellation point may have a low error protection level as the constellation points have a relatively small distance between one another in the modulation constellation mapping. In other words, an error protection level of a bit position may be based at least in part on a measure of a distance, in the modulation constellation mapping, between a pair of constellation points that differ only in the bit position. The measure of the distance may be a mean squared error (MSE) measurement.

For example, as shown in FIG. 4D, if the input bit vector is 1111, the mapper of a Tx device may map the bit vector to the corresponding constellation point to generate a modulated symbol. The Tx device may transmit, to an Rx device, the modulated symbol. The Rx device may receive the modulated symbol and may demap the modulated symbol using the modulation constellation mapping. However, if an in-phase amplitude and/or quadrature amplitude vary due to channel conditions (e.g., due to noise associated with the channel), then the Rx device may incorrectly demap the received modulated symbol to the constellation point corresponding to the bit vector of 0111 (e.g., as the two constellation points are located proximate to one another in the modulation constellation mapping). Therefore, the first bit position may have a low error protection level as small variations in the signal may result in incorrect demapping at the Rx device for the first bit position.

As shown by reference number 450, a third constellation point corresponding to a bit vector of 0100 and a fourth constellation point corresponding to a bit vector of 0101 are shown. The third constellation point and the fourth constellation point may differ only in the fourth (e.g., last) bit position. As shown in FIG. 4D, the third constellation point and the fourth constellation point may have a high error protection level as the constellation points have a relatively large distance between one another in the modulation constellation mapping. Therefore, the fourth bit position may have a higher error protection level (e.g., than the first bit position) as small variations in the signal may not result in incorrect demapping at the Rx device for the fourth bit position.

As described above, the bitwise autoencoder may be trained without an encoding and decoding functionality. Therefore, the bitwise autoencoder may assume that each bit position in a modulated symbol is associated with a similar type of information and/or has an equal level of importance. However, in some cases, an encoder may place more important bits in a most significant bit (MSB) position and less important bits in a least significant bit (LSB) position (e.g., as described in more detail below in connection with FIG. 5). The MSB may be the bit in a binary number which is of the greatest numerical value (e.g., the first bit). The LSB may be the bit in a binary number which is of the lowest numerical value (e.g., the last bit). More important bits may be a type of coded bit that is associated with a greater importance for data recovery at the Rx device than a second type of coded bit (e.g., a less important bit). As another example, more important bits may be coded bits that are more difficult to correct or compensate for decoding errors at a decoder (e.g., a receiver) than less important bits (e.g., less important bits may be easier to correct or compensate for decoding errors than more important bits). For example, where LDPC coding is used by an encoder, more important bits may be systematic bits and less important bits may be parity bits. As a result, the modulation constellation mapping learned by a bitwise autoencoder may provide a lower error protection level to bit positions (e.g., the MSB) that carry more important bits (e.g., systematic bits) and may provide a higher error protection level to bit positions (e.g., the LSB) that carry less important bits (e.g., parity bits). This may degrade a reliability of communications that use these modulation constellation mappings learned by a bitwise autoencoder as more important bits of a modulated symbol may have a lower reliability.

As indicated above, FIGS. 4A-4D are provided as examples. Other examples may differ from what is described with respect to FIGS. 4A-4D.

Figure 5:
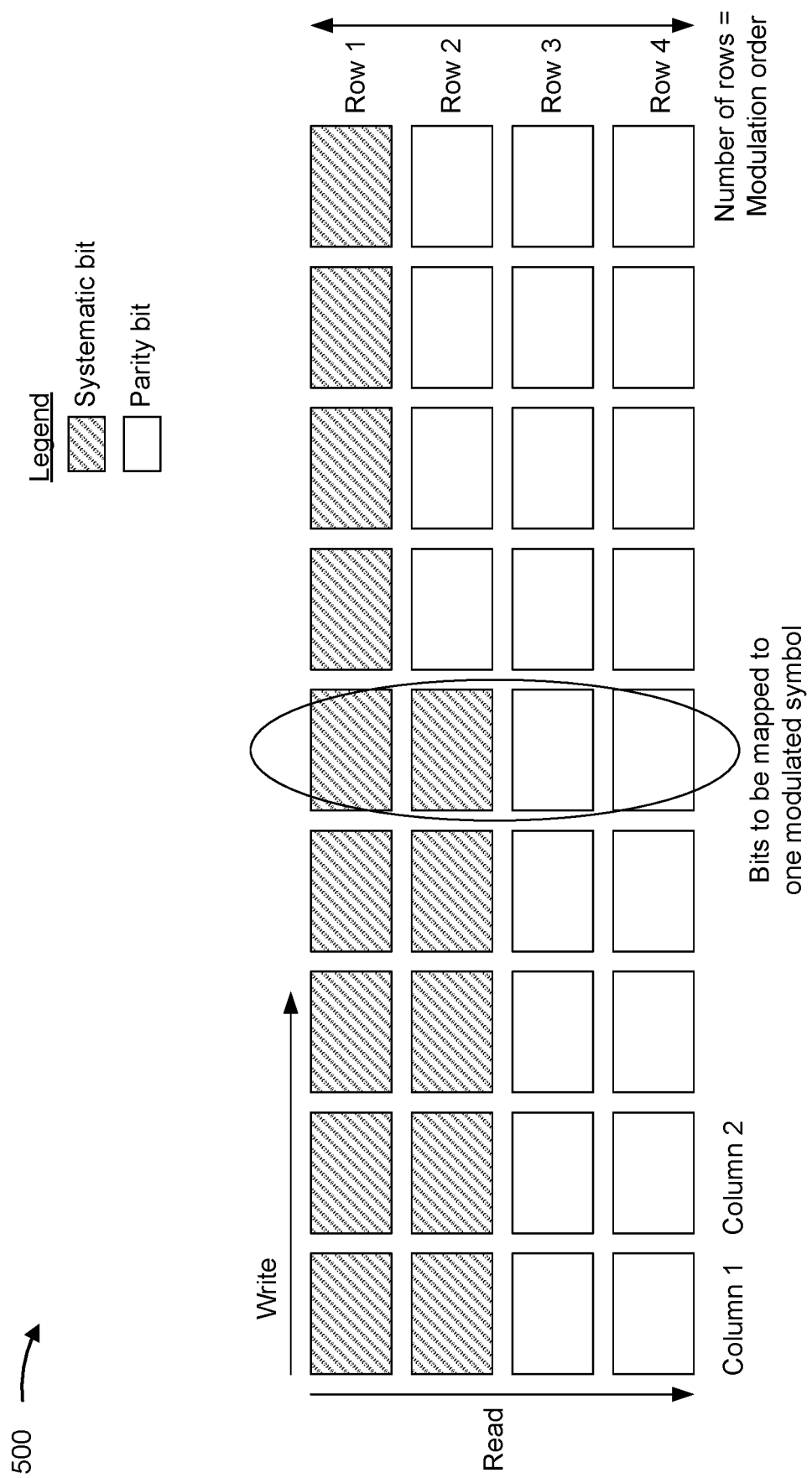
FIG. 5 is a diagram illustrating an example of interleaving, in accordance with the present disclosure.

FIG. 5 is a diagram illustrating an example 500 of interleaving, in accordance with the present disclosure.

In NR and other types of radio access technologies, interleaving may be performed after (or as the last step of) rate matching to map bits to symbols for modulation. Interleaving may improve reliability of a transmitted communication by, for example, improving robustness of forward error correction at an Rx device. For example, interleaving may result in bits, which are consecutive prior to interleaving, being spaced out (e.g., in MIMO layers, frequency, and/or time) such that some of those bits are no longer consecutive. This may mitigate the effects of burst errors, thereby reducing local gaps in communications, such as gaps in voice, video, data, and/or other communications.

A communication transmitted over the air may include systematic bits (e.g., also referred to as information bits or message bits) and parity bits (e.g., also referred to as check bits), which together form coded bits (e.g., a codeword) of the communication. The systematic bits may carry the information to be conveyed, and the parity bits may be used for error detection and/or error correction (e.g., using a checksum, and/or a cyclic redundancy check). In some aspects, the parity bits are a function of and/or determined based at least in part on the systematic bits.

Systematic bit priority mapping (SBPM) is a technique to map systematic bits of a communication to the most significant bits of each modulated symbol of the communication. This increases reliability due to an increased likelihood of correct demodulation of the systematic bits because the most significant bits (e.g., the most significant bit, or one or more most significant bits) of the modulated symbol have increased protection against errors as compared to the least significant bits (e.g., the least significant bit, or one or more least significant bits) of the modulated symbol when using conventional modulation constellations, such as PSK and/or QAM. For example, even if a receiver incorrectly demodulates a modulated symbol, that incorrect demodulation is likely to correspond to a constellation point, in a constellation diagram for the conventional modulation scheme, that is near the correct constellation point and that has one or more most significant bits in common with the correct constellation point.

An example of SBPM interleaving (e.g., using block interleaving) is shown in FIG. 5. In example 500, each block represents a bit, which may be a systematic bit or a parity bit, as shown. A column of blocks represents a number of bits that are mapped to a single symbol (e.g., a single modulated symbol). The number of bits (e.g., the number of rows in a column) is equal to the modulation order. Thus, interleaving may be a function of modulation order. In example 500, each modulated symbol represents 4 bits, which has a modulation order of 4 (e.g., 4 bits per symbol). The number of columns may depend on the size of the communication to be transmitted. For example, the number of columns may be equal to the total number of coded bits (e.g., systematic bits plus parity bits) to be transmitted, divided by the modulation order. In example 500, there are 36 coded bits to be transmitted with a modulation order of 4, leading to 9 columns of blocks.

In some aspects, block interleaving (e.g., SBPM interleaving) may be performed using a technique called write by row, read by column. Using this technique, bits may be obtained from a circular buffer as part of a rate matching process, with a starting bit determined based at least in part on a redundancy version, of the communication, to be transmitted. As the bits are obtained, those bits may be written to blocks across a first row (shown as row 1), where each bit is placed in a different column corresponding to a different symbol. After the first row is filled, bits may be written to blocks across a second row (shown as row 2), and so on. The starting bit and a set of subsequent bits of the circular buffer may be systematic bits, and may be followed by parity bits. As a result, the first one or more rows (shown toward the top of FIG. 5) may include systematic bits, and the last one or more rows (shown toward the bottom of FIG. 5) may include parity bits.

Because the first row(s) correspond to more significant bits (e.g., MSBs) of the modulated symbol and the last row(s) correspond to less significant bits (e.g., LSBs) of the modulated symbol, this technique may map systematic bits (e.g., some, most, or all of the systematic bits, depending on a starting bit in the circular buffer) to the most significant bit(s) of the modulated symbol, thereby increasing reliability, as described above. In example 500, the first row corresponds to the MSB of the modulated symbol, and is filled entirely with systematic bits, and the last row corresponds to the LSB of the modulated symbol, and is filled entirely with parity bits.

After all of the coded bits are written to the blocks, referred to as interleaving, those interleaved bits are read from the blocks down a first column (e.g., shown as column 1) as input to a modulation process to modulate those coded bits in a modulated symbol. After modulation, the coded bits in the first column will be represented as a first modulated symbol, the coded bits in a second column (e.g., shown as column 2) will be represented as a second modulated symbol, and so on. In some aspects, the interleaving and/or the modulation may be performed to first map the modulated symbols to a layer (e.g., a MIMO layer), then map the modulated symbols to a frequency, and then map the modulated symbols to time. In this way, protection from burst errors may be enhanced.

However, as described above in connection with FIGS. 4A-4D, in bitwise autoencoder based wireless communication systems, an MSB of a modulated symbol may not have a higher error protection level than an LSB of the modulated symbol. Therefore, using block interleaving (e.g., SBPM interleaving) may result in systematic bits of a communication being placed in less reliable bit positions of a modulated symbol and parity bits of the communication being placed in more reliable bit positions of a modulated symbol. For example, using the modulation constellation diagram shown in FIG. 4D for mapping to constellation points, row 4 may correspond to the most reliable bit position of modulated symbols (e.g., the LSB may be the most reliable bit position) and row 1 may correspond to the least reliable bit position of modulated symbols (e.g., the MSB may be the least reliable bit position). Therefore, in some cases when using a bitwise autoencoder system, the advantages of using block interleaving (e.g., SBPM interleaving) may be degraded and a reliability of the communication may be decreased.

Moreover, it may be difficult and/or impossible to use a modulation order that results in equal protection for constellations learned by the bitwise autoencoder, such as the constellation for an SNR of 10 dB and a modulation order of 4 described above in connection with FIGS. 4A-4C. For example, the output (e.g., the learned constellation) of the bitwise autoencoder depends on a target SNR and/or an SNR range. Therefore, the learned constellation of the bitwise autoencoder varies as channel conditions vary (e.g., as an SNR of the channel varies). Therefore, it may be difficult to adapt the modulation order of communications to changing channel conditions. Moreover, using a lower modulation order (e.g., a modulation of 3 rather than 4) may reduce a spectral efficiency of communications. Furthermore, it may be difficult to predict the learned constellations of the bitwise autoencoder as the output varies with the channel conditions, as described above. Therefore, it may be difficult to predict which bit position of a modulated symbol will be associated with a highest error protection level (e.g., is the most reliable) when using a bitwise autoencoder system. It may be possible to train a bitwise autoencoder neural network with an encoder and decoder functionality to train the neural network to place more important bits in reliable bit positions. However, training a bitwise autoencoder with an encoder and decoder functionality significantly increases an overhead and complexity associated with training the bitwise autoencoder.

Some techniques and apparatuses described herein enable bit interleaving for bitwise autoencoder based communications. For example, a wireless communication device (e.g., a Tx device and/or an Rx device) may train a bitwise autoencoder neural network to obtain a constellation mapping (e.g., a modulation constellation diagram) to be used for mapping coded bits to modulated symbols. The wireless communication device may determine a bit position ordering for bit positions of modulated symbols associated with the constellation mapping based at least in part on error protection levels of bit positions associated with the constellation mapping. For example, the bit position ordering may order bit positions from a highest error protection level (e.g., a most reliable bit position) to a lowest error protection level (e.g., a least reliable bit position), or vice versa. The wireless communication device may perform bit interleaving for one or more coded bits of a communication, based at least in part on the bit position ordering, to obtain one or more interleaved bits. For example, when performing the bit interleaving, the wireless communication device may re-order the rows of a matrix according to the bit position ordering to ensure that more important bits (e.g., systematic bits) are placed in more reliable bit positions (e.g., bit positions with a higher error protection level). The wireless communication device may generate one or more modulated symbols for the communication by mapping the one or more interleaved bits using the constellation mapping. The wireless communication device may transmit, to an Rx device, the one or more modulated symbols. The Rx device may deinterleave the modulated symbols based at least in part on the bit position ordering to approximately reconstruct the one or more coded bits transmitted by the wireless communication device.

As a result, the wireless communication device may ensure that more important bits of a communication (e.g., systematic bits) are placed in more reliable bit positions (e.g., bit positions with a higher error protection level) when using a bitwise autoencoder to obtain an optimized constellation mapping. This may enable the wireless communication device to dynamically adapt to a constellation learned by the bitwise autoencoder neural network to improve the reliability of bitwise autoencoder based communications while maintaining the advantages of using an optimized constellation mapping learned by the bitwise autoencoder. Moreover, this may enable the wireless communication device to use a bitwise autoencoder that is trained without an encoder and decoder functionality, thereby significantly decreasing the overhead and complexity associated with training the bitwise autoencoder.

As indicated above, FIG. 5 is provided merely as an example. Other examples may differ from what was described with regard to FIG. 5.

Figure 6A:
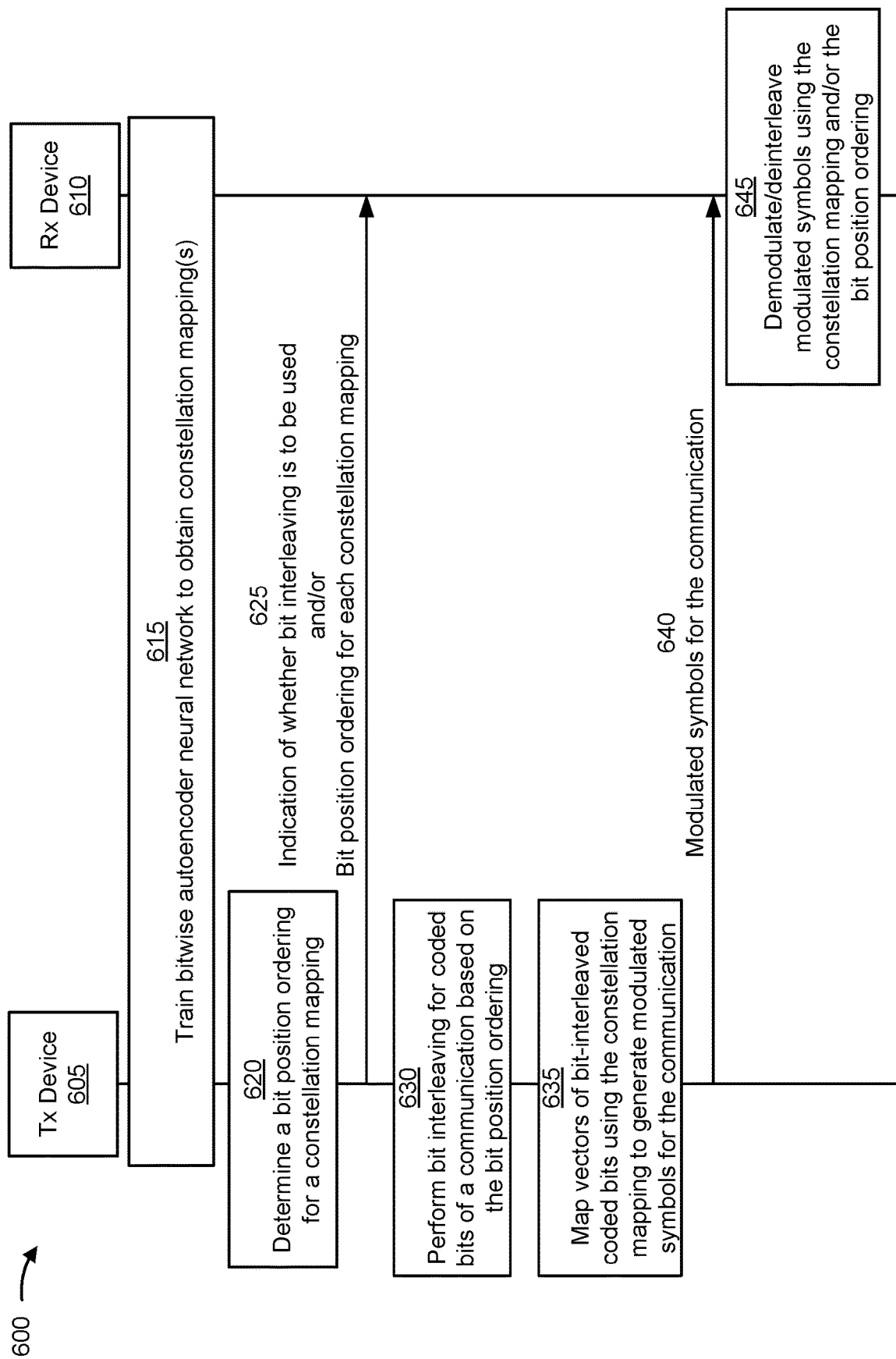
FIGS. 6A and 6B are diagrams illustrating examples associated with bit interleaving for bitwise autoencoder based communications, in accordance with the present disclosure.
Figure 6B:
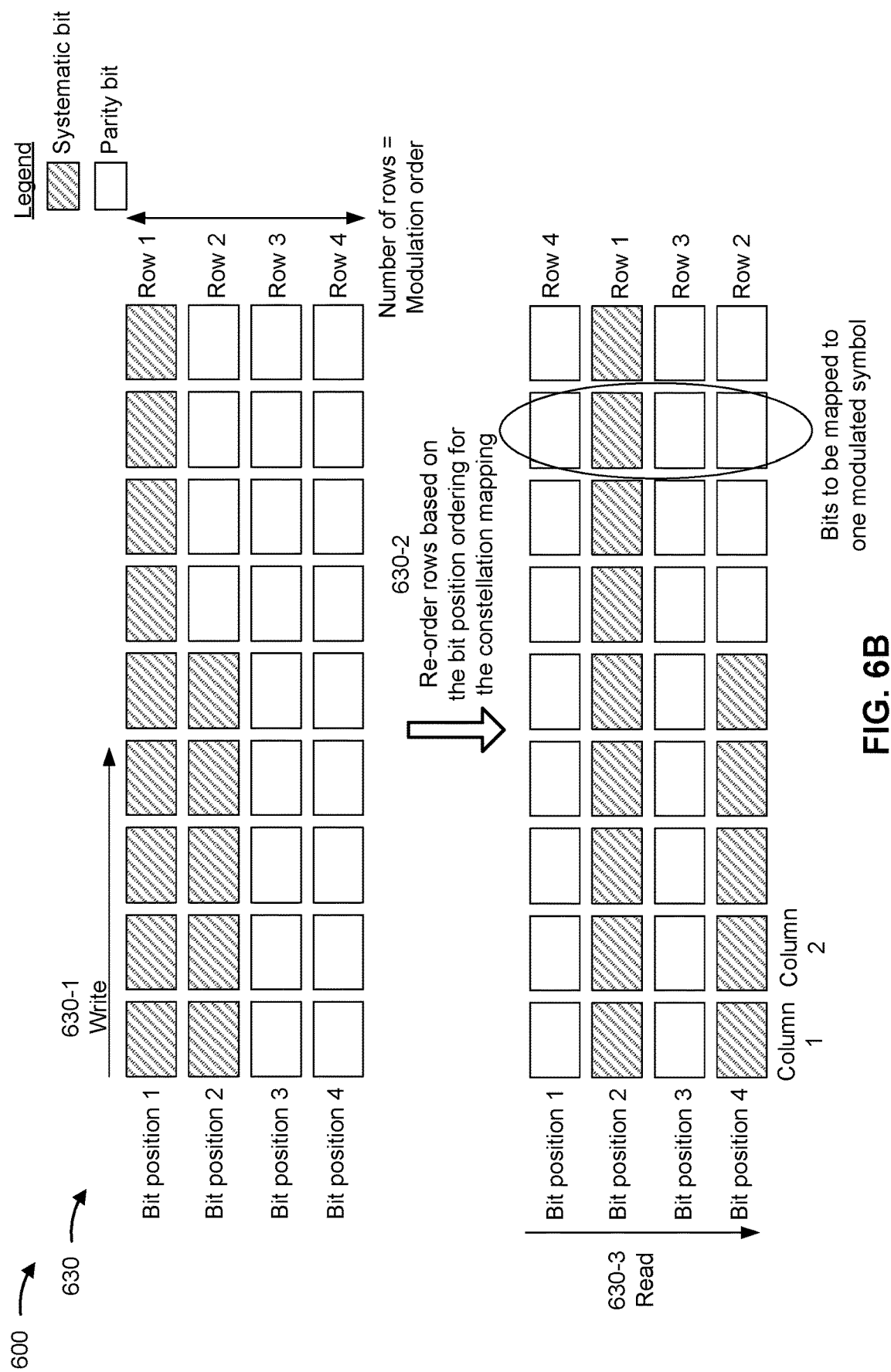

FIGS. 6A and 6B are diagrams illustrating an example 600 associated with bit interleaving for bitwise autoencoder based communications, in accordance with the present disclosure. As shown in FIGS. 6A and 6B, example 600 includes communication between a Tx device 605 and an Rx device 610. The Tx device 605 and/or the Rx device 610 may be a wireless communication device, such as a base station 110 or a UE 120, among other examples. As used herein, "Tx device" may refer to a wireless communication device that is transmitting a communication in the associated example (e.g., and not a wireless communication device that is only enabled to transmit communications). Similarly, as used herein, "Rx device" may refer to a wireless communication device that is receiving a communication in the associated example (e.g., and not a wireless communication device that is only enabled to transmit communications). For example, the Tx device 605 may receive one or more communications in a similar manner as described herein in connection with the Rx device 610. Similarly, the Rx device 610 may transmit one or more communications in a similar manner as described herein in connection with the Tx device 605. In some aspects, the Tx device 605 and the Rx device 610 may be included in a wireless network, such as wireless network 100. The Tx device 605 and the Rx device 610 may communicate via a wireless access link, which may include an uplink and a downlink.

As shown by reference number 615, the Tx device 605 and/or the Rx device 610 may train a bitwise autoencoder neural network to obtain (e.g., learn) one or more constellation mappings. For example, the Tx device 605 may train the bitwise autoencoder neural network to obtain (e.g., learn) a constellation mapping based at least in part on a modulation order, a code rate, an operating or target SNR, and/or an SNR range associated with the operating or target SNR, among other examples. This may enable the bitwise autoencoder neural network to learn an optimized constellation mapping for the modulation order, the code rate, the operating or target SNR, and/or the SNR range (e.g., in a similar manner as described above in connection with FIGS. 4A-4C).

As described above, a neural network at the Tx device 605 and a neural network at the Rx device 610 for the bitwise autoencoder may be trained jointly. In some aspects, both neural networks may be trained by one device (e.g., the Tx device 605 or the Rx device 610) and indicated to the other device. In some aspects, the Tx device 605 and the Rx device 610 may communicate to jointly train the neural networks of the bitwise autoencoder. For example, the Tx device 605 may transmit, to the Rx device 610, a configuration indicating one or more constellation mappings obtained (e.g., learned) at the Tx device 605. In some aspects, the Tx device 605 may transmit, to the Rx device 610, an indication of the neural network to be applied at the Rx device 610 for the bitwise autoencoder (e.g., may indicate one or more weights for different layers of the neural network).

As shown by reference number 620, the Tx device 605 may determine, for a constellation mapping learned by the bitwise autoencoder neural network, a bit position ordering for bit positions of modulated symbols associated with the constellation mapping based at least in part on error protection levels of bit positions associated with the constellation mapping. "Bit position" may refer to a position in a modulated symbol. For example, for a modulation order of 4, a modulated symbol may have 4 bit positions (e.g., ordered in a first bit position, a second bit position, a third bit position, and a fourth bit position). For example, a modulated symbol with bit values of "1011" may have a value of "1" for the first bit position, a value of "0" for the second bit position, a value of "1" for the third bit position, and a value of "1" for the fourth bit position.

The Tx device 605 may determine, for a bit position, a distance measurement between one or more pairs of constellation points in the constellation mapping for the bit position. A pair of constellation points for a bit position may include two constellation points that differ only in the bit position (e.g., constellation points corresponding to bit vectors of "1011" and "0011" may be a pair of constellation points for the first bit position). In some aspects, the distance measurement may be a minimum MSE for the one or more pairs of constellation points, a maximum MSE for the one or more pairs of constellation points, and/or an average MSE for the one or more pairs of constellation points.

The Tx device 605 may determine, for the bit position, an error protection level for the bit position based at least in part on the distance measurement. For example, a small MSE may indicate that pairs of constellation points for a bit position are located close together in the constellation mapping. This may indicate a low error protection level for the bit position as small variations in a signal may result in incorrect demapping for the bit position due to the pairs of constellation points for the bit position being located close together (e.g., clustered) in the constellation mapping, as described above. For example, for constellation points corresponding to bit vectors of "1011" and "0011" a small variation in a transmitted signal (e.g., due to noise associated with the channel) may result in a transmitted modulated symbol of "1011" being demapped at the Rx device 610 as "0011" (e.g., the first bit position may be incorrectly demapped).

The Tx device 605 may determine, for each bit position for modulated symbols associated with the constellation mapping, an error protection level (e.g., in a similar, or the same, manner as described above). The Tx device 605 may determine the bit position ordering for the constellation mapping based at least in part on comparing the error protection levels for each bit position. For example, the bit position ordering may order the bit positions from a lowest error protection level to a highest error protection level or from a highest error protection level to a lowest error protection level. In some aspects, the Tx device 605 may order the bit positions from a lowest error protection level to a highest error protection level or from a highest error protection level to a lowest error protection level based at least in part on a configuration of the Tx device 605. For example, the method of ordering (e.g., lowest to highest error protection level or highest to lowest error protection level) may be defined, or otherwise fixed, by a 3GPP Specification. In some aspects, the Tx device 605 may determine a bit position ordering for each constellation mapping learned by the bitwise autoencoder neural network in a similar, or the same, manner as described herein.

In some aspects, if two or more bit positions have the same (or similar) error protection levels, then the Tx device 605 may order the bit positions based at least in part on a default position of the bit position (e.g., a default position for the first bit position is the first position, a default position for second bit position is the second position, and so on). For example, the Tx device 605 may determine that a first error protection level for a first bit position is the same as or within a threshold amount of a second error protection level for a second bit position. The Tx device 605 may determine a bit position ordering for the first bit position and the second bit position based at least in part on a default position of the first bit position and a default position of the second bit position within modulated symbols associated with the constellation mapping. For example, if the third bit position and the fourth bit position have the same (or similar) error protection levels, then the Tx device 605 may order the third bit position before the fourth bit position in the bit position ordering for the constellation mapping.

As shown by reference number 625, the Tx device 605 may transmit, to the Rx device 610, an indication of whether bit interleaving (e.g., using the bit position ordering, as described in more detail below) is to be used for communications between the Tx device 605 and the Rx device 610. Additionally, or alternatively, if bit interleaving is to be used for communications between the Tx device 605 and the Rx device 610, then the Tx device 605 may transmit, to the Rx device 610, an indication of the bit position ordering for one or more (or all) of the constellation mapping learned by the bitwise autoencoder neural network. The Tx device 605 may transmit the indication that bit interleaving is to be performed and/or the bit position ordering via a control message that schedules a communication, a semi-static configuration (e.g., a radio resource control (RRC) configuration), a demapping configuration associated with the bitwise autoencoder neural network (e.g., that indicates the constellation mapping(s) learned at the Tx device 605), and/or an indication of a bitwise autoencoder neural network for the Rx device 610, among other examples.

For example, the Tx device 605 may determine that bit interleaving is to be used based at least in part on a difference in error protection levels for bit positions associated with the constellation mapping. For example, if there is unequal error protection in the constellation mapping (e.g., a difference in error protection levels for different bit positions that satisfies a threshold), then the Tx device 605 may determine that bit interleaving is to be used to ensure that more important bits (e.g., systematic bits) are placed or mapped to bit positions that have a higher error protection level. In some aspects, the Tx device 605 may determine a difference between error protection levels for each bit position for modulated symbols associated with the constellation mapping. The Tx device 605 may determine whether the difference (e.g., at least one difference between error protection levels of two bit positions) satisfies a threshold. The Tx device may determine that bit interleaving is to be performed based at least in part on determining that the difference satisfies the threshold. For example, if the constellation mapping has relatively equal error protection for all bit positions, then it may not be necessary to perform bit interleaving, as described below, and/or a static bit interleaving technique (e.g., as described above in connection with FIG. 5) may be used. However, if the constellation mapping has unequal error protection for bit positions, then it may be necessary to perform dynamic bit interleaving, as described below.

In some aspects, if a difference in error protection levels (e.g., at least one difference between error protection levels of two bit positions) satisfies a modulation order threshold, then the Tx device 605 may determine that a modulation order for the communication should be modified. For example, if a difference in error protection levels (e.g., at least one difference between error protection levels of two bit positions) satisfies the modulation order threshold, then the Tx device 605 may determine that a modulation order for the communication should be lowered, such that the modulated symbols for the communication include a lower number of bits (e.g., from a modulation order of 4 to a modulation order of 3). The Tx 605 may identify a constellation mapping and/or train the bitwise autoencoder to obtain a constellation mapping for the modified modulation order. The Tx 605 may perform one or more (or all) of the operation described herein for bit interleaving for bitwise autoencoder based communications using the modified modulation order. In this way, the Tx UE 605 may be enabled to change the modulation order when an originally selected modulation order results in a constellation mapping having a large difference in error protection levels for bit positions.

As shown by reference number 630, the Tx device 605 may perform bit interleaving for coded bits of a communication based at least in part on the bit position ordering. For example, the Tx device 605 may perform the bit interleaving to prioritize mapping a type of coded bit that is associated with a greater importance for data recovery into bit positions having higher error protection levels according to the bit position ordering. For example, where LDPC coding is used to generate the coded bits, the Tx device 605 may perform the bit interleaving to map systematic bits to bit positions having higher error protection levels in the constellation mapping. In some aspects, where another type of coding is used to generate the coded bits, the type of coded bit of the coded bits that is associated with a greater importance for data recovery may be a different type of bit, such as a cyclic redundancy check (CRC) bit, among other examples.

As shown in FIG. 6B, an example of bit interleaving for bitwise autoencoding based communications is shown. For example, the Tx device 605 may arrange the coded bits of the communication (e.g., of a code block) into a matrix that includes m rows and E/m columns, where m is the modulation order and E is the number of bits of the communication (e.g., of the code block). As shown by reference number 630-1, the Tx device 605 may write the coded bits to blocks of the matrix across a first row (shown as row 1), where each bit is placed in a different column corresponding to a different symbol. After the first row is filled, bits may be written to blocks across a second row (shown as row 2), and so on. For example, the Tx device 605 may write the coded bits of the communication in blocks of the matrix in a similar manner as described above in connection with FIG. 5. For example, the Tx device 605 may write the coded bits of the communication in blocks of the matrix to place systematic bits in MSBs (e.g., bit position 1 and/or 2) and to place parity or redundant bits in LSBs (e.g., bit position 3 and/or 4).

However, as described above, for a constellation mapping, MSBs may not have a highest error protection level among all bit positions. Therefore, as shown by reference number 630-2, the Tx device 605 may re-order the rows based at least in part on the bit position ordering for the constellation mapping to be used by the Tx device 605. For example, the Tx device 605 may place row 1 in a bit position that has a highest error protection level, row 2 in a bit position that has the next highest error protection level, and so on. For example, in the example depicted in FIG. 6B, the bit position order (e.g., from highest error protection level to lowest error protection level) for the constellation mapping to be used by the Tx device 605 may be bit position 2, followed by bit position 4, followed by bit position 3, followed by bit position 1. Therefore, the Tx device 605 may re-order the rows of the matrix to place row 1 in bit position 2, row 2 in bit position 4, row 3 in bit position 3, and row 4 in bit position 1.

As shown by reference number 630-3, the Tx device 605 may read the interleaved bits from the blocks down a first column (e.g., shown as column 1) as input to a modulation process to modulate those coded bits in a modulated symbol. After modulation, the coded bits in the first column will be represented as a first modulated symbol, the coded bits in a second column (e.g., shown as column 2) will be represented as a second modulated symbol, and so on. Therefore, the Tx device 605 may prioritize placing more important bits (e.g., systematic bits) in bit positions having a higher error protection level for the learned constellation mapping to be used by the Tx device 605. This may enable the Tx device 605 to dynamically adapt to the learned constellation mapping (e.g., which may change due to varying channel conditions) to ensure that more important bits (e.g., systematic bits) are placed in bit positions having a higher error protection level (e.g., rather than always placing the systematic bits in an MSB position as described above in connection with FIG. 5).

Returning to FIG. 6A, as shown by reference number 635, the Tx device 605 may map the interleaved bits using the learned constellation mapping to generate modulated symbols for the communication. For example, the Tx device 605 may obtain a bit vector of bit interleaved coded bits from a column of the matrix described and depicted in connection with FIG. 6B. The Tx device 605 may map the bit vector to a corresponding constellation point in the learned constellation mapping to generate a modulated symbol.

As shown by reference number 640, the Tx device 605 may transmit, to the Rx device 610, the one or more modulated symbols for the communication. As shown by reference number 645, the Rx device 610 may receive the one or more modulated symbols and may demap the modulated symbols using the learned constellation mapping that was used by the Tx device 605. For example, the Rx device 610 may obtain a bit vector by mapping a received signal to a constellation point in the learned constellation mapping. The Rx device 610 may deinterleave the bit vector based at least in part on the bit position ordering associated with the learned constellation mapping (e.g., by performing an inverse process to the bit interleaving process described above). For example, the Rx device 610 may read the received bit vectors into a matrix by column. The Rx device 610 may reorder the rows of the matrix based at least in part on the bit position order. The Rx device 610 may read out the bits of the matrix by rows to attempt to reconstruct the coded bits that were input at the Tx device 605. The Rx device 610 may decode the coded bits to approximately reconstruct the information carried by the bits (e.g., that is input at the Tx device 605).

As a result, the Tx device 605 may ensure that more important bits of a communication (e.g., systematic bits) are placed in more reliable bit positions (e.g., bit positions with a higher error protection level) when using a bitwise autoencoder to obtain an optimized constellation mapping. This may enable the Tx device 605 to dynamically adapt to a constellation learned by the bitwise autoencoder neural network to improve the reliability of bitwise autoencoder based communications while maintaining the advantages of using an optimized constellation mapping learned by the bitwise autoencoder. Moreover, this may enable the Tx device 605 to use a bitwise autoencoder that is trained without an encoder and decoder functionality, thereby significantly decreasing the overhead and complexity associated with training the bitwise autoencoder.

As indicated above, FIGS. 6A and 6B are provided as an examples. Other examples may differ from what is described with respect to FIGS. 6A and 6B.

FIG. 7 is a diagram illustrating an example process 700 performed, for example, by a wireless communication device, in accordance with the present disclosure. Example process 700 is an example where the wireless communication device (e.g., a base station 110, a UE 120, and/or the Tx device 605) performs operations associated with bit interleaving for bitwise autoencoder based communications.

As shown in FIG. 7, in some aspects, process 700 may include training a bitwise autoencoder neural network to obtain a constellation mapping to be used for mapping coded bits to modulated symbols (block 710). For example, the wireless communication device (e.g., using autoencoder training component 808, depicted in FIG. 8) may train a bitwise autoencoder neural network to obtain a constellation mapping to be used for mapping coded bits to modulated symbols, as described above.

As further shown in FIG. 7, in some aspects, process 700 may include determining a bit position ordering for bit positions of modulated symbols associated with the constellation mapping based at least in part on error protection levels of bit positions associated with the constellation mapping (block 720). For example, the wireless communication device (e.g., using determination component 810, depicted in FIG. 8) may determine a bit position ordering for bit positions of modulated symbols associated with the constellation mapping based at least in part on error protection levels of bit positions associated with the constellation mapping, as described above.

As further shown in FIG. 7, in some aspects, process 700 may include performing bit interleaving for one or more coded bits of a communication, based at least in part on the bit position ordering of the constellation mapping, to obtain one or more interleaved bits (block 730). For example, the wireless communication device (e.g., using bit interleaving component 812, depicted in FIG. 8) may perform bit interleaving for one or more coded bits of a communication, based at least in part on the bit position ordering of the constellation mapping, to obtain one or more interleaved bits, as described above.

As further shown in FIG. 7, in some aspects, process 700 may include generating one or more modulated symbols for the communication by mapping the one or more interleaved bits using the constellation mapping (block 740). For example, the wireless communication device (e.g., using signal generation component 814, depicted in FIG. 8) may generate one or more modulated symbols for the communication by mapping the one or more interleaved bits using the constellation mapping, as described above.

As further shown in FIG. 7, in some aspects, process 700 may include transmitting, to a receiver device, the one or more modulated symbols for the communication (block 750). For example, the wireless communication device (e.g., using transmission component 804, depicted in FIG. 8) may transmit, to a receiver device, the one or more modulated symbols for the communication, as described above.

Process 700 may include additional aspects, such as any single aspect or any combination of aspects described below and/or in connection with one or more other processes described elsewhere herein.

In a first aspect, training the bitwise autoencoder neural network to obtain the constellation mapping includes training the bitwise autoencoder neural network to obtain the constellation mapping based at least in part on at least one of a modulation order, a code rate, an operating SNR, an SNR range associated with the operating SNR, or a combination thereof.

In a second aspect, alone or in combination with the first aspect, determining the bit position ordering for modulated symbols associated with the constellation mapping includes determining, for a bit position, a distance measurement between one or more pairs of constellation points in the constellation mapping for the bit position, determining, for the bit position, an error protection level for the bit position based at least in part on the distance measurement, determining, for each bit position for modulated symbols associated with the constellation mapping, an error protection level, and determining the bit position ordering based at least in part on comparing the error protection levels for each bit position.

In a third aspect, alone or in combination with one or more of the first and second aspects, the distance measurement is at least one of a minimum MSE for the one or more pairs of constellation points, a maximum MSE for the one or more pairs of constellation points, an average MSE for the one or more pairs of constellation points, or a combination thereof.

In a fourth aspect, alone or in combination with one or more of the first through third aspects, determining the bit position ordering for modulated symbols associated with the constellation mapping includes determining to order the bit positions from a lowest error protection level to a highest error protection level or from a highest error protection level to a lowest error protection level based at least in part on a configuration of the wireless communication device.

In a fifth aspect, alone or in combination with one or more of the first through fourth aspects, process 700 includes transmitting, to the receiver device, an indication of at least one of: whether the wireless communication device is to perform the bit interleaving that is based at least in part on the bit position ordering of the constellation mapping, the bit position ordering of the constellation mapping, or a combination thereof.

In a sixth aspect, alone or in combination with one or more of the first through fifth aspects, transmitting the indication includes transmitting, to the receiver device, the indication via at least one of: a control message that schedules the communication, a semi-static configuration, a demapping configuration associated with the bitwise autoencoder neural network, an indication of a bitwise autoencoder neural network for the receiver device, or a combination thereof.

In a seventh aspect, alone or in combination with one or more of the first through sixth aspects, performing the bit interleaving for the one or more coded bits of the communication includes determining a difference between error protection levels for each bit position for modulated symbols associated with the constellation mapping, determining whether the difference satisfies a threshold, and performing the bit interleaving for the one or more coded bits of the communication if the difference satisfies the threshold.

In an eighth aspect, alone or in combination with one or more of the first through seventh aspects, determining the bit position ordering for modulated symbols associated with the constellation mapping includes determining that a first error protection level for a first bit position is the same as or within a threshold amount of a second error protection level for a second bit position, and determining a bit position ordering for the first bit position and the second bit position based at least in part on a default position of the first bit position and a default position of the second bit position within modulated symbols associated with the constellation mapping.

In a ninth aspect, alone or in combination with one or more of the first through eighth aspects, performing the bit interleaving for the one or more coded bits of the communication includes performing the bit interleaving to map a first type of coded bit of the one or more coded bits into bit positions having higher error protection levels according to the bit position ordering, wherein the first type of coded bit is associated with a greater importance for data recovery at the receiver device than a second type of coded bit.

In a tenth aspect, alone or in combination with one or more of the first through ninth aspects, the first type of coded bit is a systematic bit and the second type of coded bit is a parity bit.

In an eleventh aspect, alone or in combination with one or more of the first through tenth aspects, performing the bit interleaving for the one or more coded bits of the communication includes inputting the one or more coded bits into a matrix that includes one or more rows, wherein the number of the one or more rows is equal to a modulation order associated with the constellation mapping, ordering the one or more rows based at least in part on the bit position ordering, and obtaining a vector of interleaved coded bits based at least in part on coded bits included each column of the matrix.

In a twelfth aspect, alone or in combination with one or more of the first through eleventh aspects, determining the bit position ordering for modulated symbols associated with the constellation mapping includes determining a difference between error protection levels for each bit position for modulated symbols associated with the constellation mapping, determining that the difference satisfies a modulation order threshold, and selecting an updated modulation order for the communication based at least in part on the difference satisfying the modulation order threshold, wherein the updated modulation order is a lower modulation order than a modulation order associated with the constellation mapping, and wherein transmitting the one or more modulated symbols for the communication includes transmitting one or more modulated symbols for the communication that have the updated modulation order.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
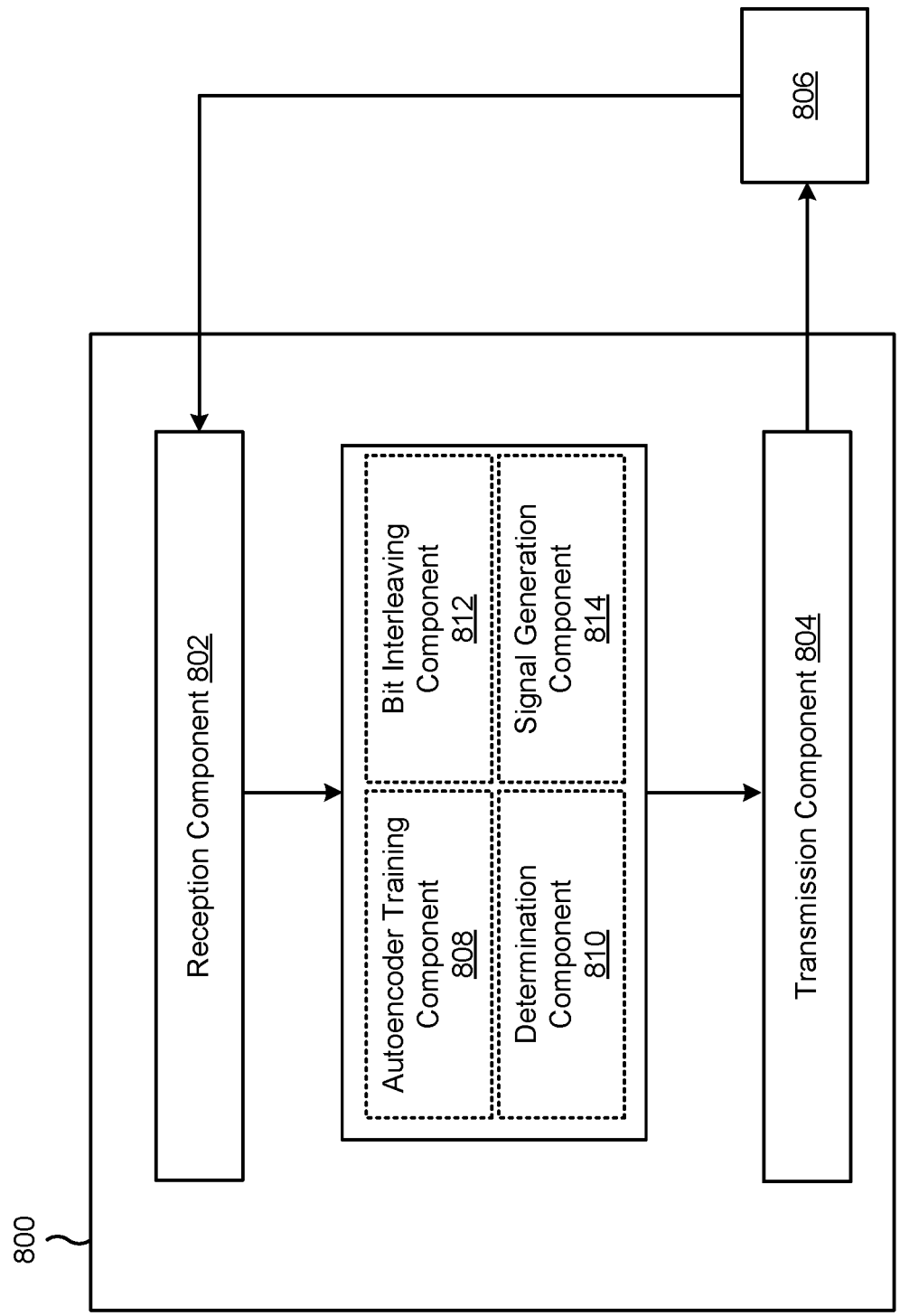
FIGS. 8 and 9 are block diagrams of example apparatuses for wireless communication, in accordance with the present disclosure.

FIG. 8 is a block diagram of an example apparatus 800 for wireless communication. The apparatus 800 may be a wireless communication device, or a wireless communication device may include the apparatus 800. For example, the wireless communication device may be a UE, a base station, and/or a Tx device. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of an autoencoder training component 808, a determination component 810, a bit interleaving component 812, and/or a signal generation component 814, among other examples.

In some aspects, the apparatus 800 may be configured to perform one or more operations described herein in connection with FIGS. 6A and 6B. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the wireless communication device (e.g., of the base station 110 and/or the UE 120) described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless communication device (e.g., of the base station 110 and/or the UE 120) described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device (e.g., of the base station 110 and/or the UE 120) described above in connection with FIG. 2. In some aspects, the transmission component 804 may be co-located with the reception component 802 in a transceiver.

The autoencoder training component 808 may train a bitwise autoencoder neural network to obtain a constellation mapping to be used for mapping coded bits to modulated symbols. The determination component 810 may determine a bit position ordering for bit positions of modulated symbols associated with the constellation mapping based at least in part on error protection levels of bit positions associated with the constellation mapping. The bit interleaving component 812 may perform bit interleaving for one or more coded bits of a communication, based at least in part on the bit position ordering of the constellation mapping, to obtain one or more interleaved bits. The signal generation component 814 may generate one or more modulated symbols for the communication by mapping the one or more interleaved bits using the constellation mapping. The transmission component 804 may transmit, to a receiver device, the one or more modulated symbols for the communication.

The autoencoder training component 808 may train the bitwise autoencoder neural network to obtain the constellation mapping based at least in part on at least one of: a modulation order, a code rate, an operating SNR, an SNR range associated with the operating SNR, or a combination thereof.

The determination component 810 may determine, for a bit position, a distance measurement between one or more pairs of constellation points in the constellation mapping for the bit position. The determination component 810 may determine, for the bit position, an error protection level for the bit position based at least in part on the distance measurement. The determination component 810 may determine, for each bit position for modulated symbols associated with the constellation mapping, an error protection level. The determination component 810 may determine the bit position ordering based at least in part on comparing the error protection levels for each bit position.

The determination component 810 may determine to order the bit positions from a lowest error protection level to a highest error protection level or from a highest error protection level to a lowest error protection level based at least in part on a configuration of the wireless communication device.

The transmission component 804 may transmit, to a receiver device, an indication of at least one of: whether the wireless communication device is to perform the bit interleaving that is based at least in part on the bit position ordering of the constellation mapping, the bit position ordering of the constellation mapping, or a combination thereof.

The transmission component 804 may transmit, to the receiver device, the indication via at least one of: a control message that schedules the communication, a semi-static configuration, a demapping configuration associated with the bitwise autoencoder neural network, an indication of a bitwise autoencoder neural network for the receiver device, or a combination thereof.

The determination component 810 may determine a difference between error protection levels for each bit position for modulated symbols associated with the constellation mapping. The determination component 810 may determine whether the difference satisfies a threshold. The bit interleaving component 812 may perform the bit interleaving for the one or more coded bits of the communication if the difference satisfies the threshold.

The determination component 810 may determine that a first error protection level for a first bit position is the same as or within a threshold amount of a second error protection level for a second bit position. The determination component 810 may determine a bit position ordering for the first bit position and the second bit position based at least in part on a default position of the first bit position and a default position of the second bit position within modulated symbols associated with the constellation mapping.

The bit interleaving component 812 may perform the bit interleaving to map a first type of coded bit of the one or more coded bits into bit positions having higher error protection levels according to the bit position ordering, wherein the first type of coded bit is associated with a greater importance for data recovery at the receiver device than a second type of coded bit.

The bit interleaving component 812 may input the one or more coded bits into a matrix that includes one or more rows, wherein the number of the one or more rows is equal to a modulation order associated with the constellation mapping. The bit interleaving component 812 may order the one or more rows based at least in part on the bit position ordering. The bit interleaving component 812 may obtain a vector of interleaved coded bits based at least in part on coded bits included each column of the matrix.

The determination component 810 may determine a difference between error protection levels for each bit position for modulated symbols associated with the constellation mapping. The determination component 810 may determine that the difference satisfies a modulation order threshold. The determination component 810 may select an updated modulation order for the communication based at least in part on the difference satisfying the modulation order threshold, wherein the updated modulation order is a lower modulation order than a modulation order associated with the constellation mapping. The transmission component 804 may transmit one or more modulated symbols for the communication that have the updated modulation order.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
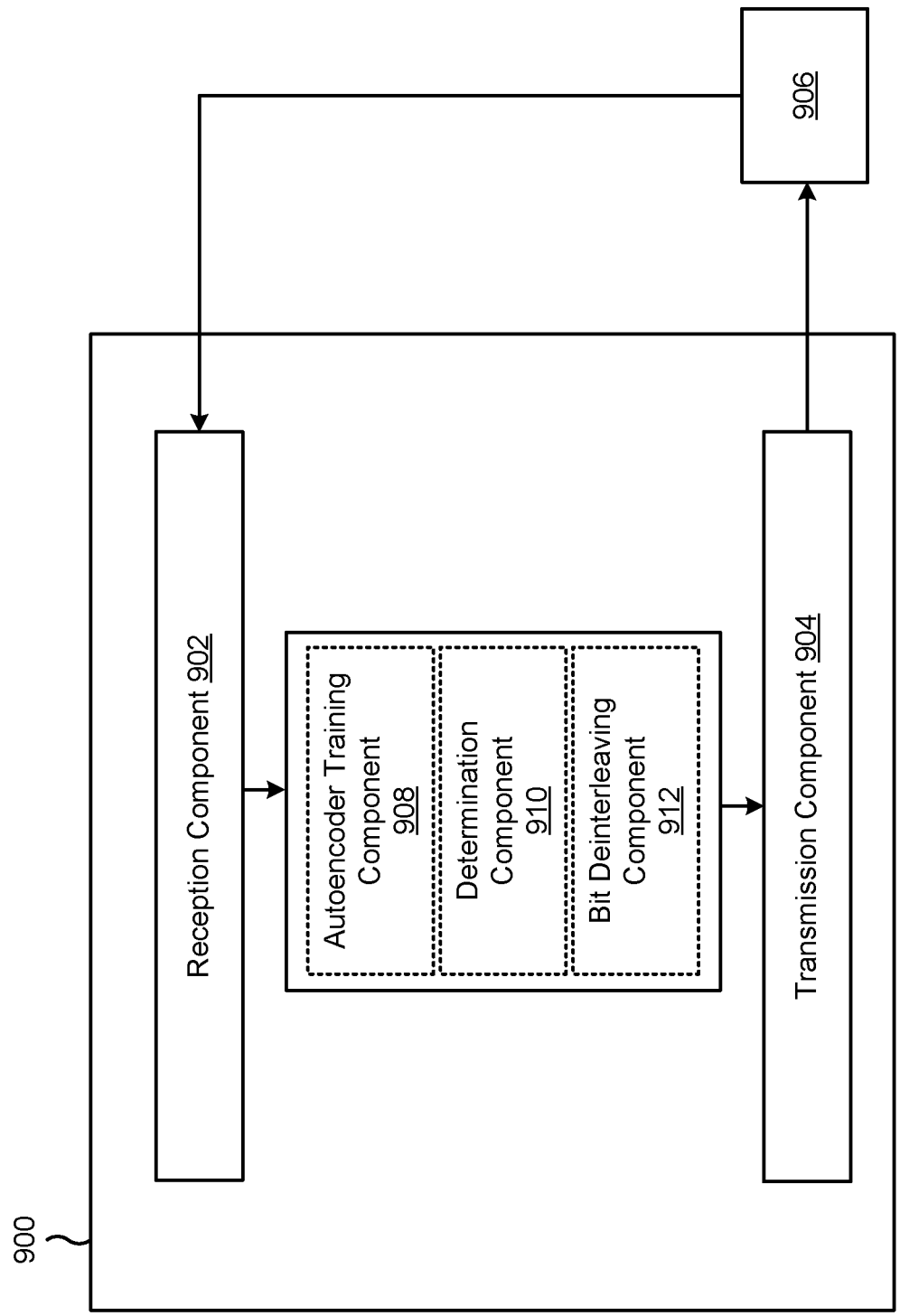

FIG. 9 is a block diagram of an example apparatus 900 for wireless communication. The apparatus 900 may be a wireless communication device, or a wireless communication device may include the apparatus 900. For example, the wireless communication device may be a UE, a base station, and/or an Rx device. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of an autoencoder training component 908, a determination component 910, and/or a bit deinterleaving component 912, among other examples.

In some aspects, the apparatus 900 may be configured to perform one or more operations described herein in connection with FIGS. 6A and 6B. Additionally, or alternatively, the apparatus 900 may be configured to perform one or more processes described herein, or a combination thereof. In some aspects, the apparatus 900 and/or one or more components shown in FIG. 9 may include one or more components of the wireless communication device (e.g., of the base station 110 and/or the UE 120) described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the wireless communication device (e.g., of the base station 110 and/or the UE 120) described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the wireless communication device (e.g., of the base station 110 and/or the UE 120) described above in connection with FIG. 2. In some aspects, the transmission component 904 may be co-located with the reception component 902 in a transceiver.

The autoencoder training component 908 may train a bitwise autoencoder neural network to obtain a constellation mapping to be used for demapping coded bits from modulated symbols. The determination component 910 may determine or identify a bit position ordering for bit positions of modulated symbols associated with the constellation mapping based at least in part on error protection levels of bit positions associated with the constellation mapping. The reception component 902 may receive one or more modulated symbols of a communication. The bit deinterleaving component 912 may perform bit deinterleaving for the one or more modulated symbols, based at least in part on the bit position ordering of the constellation mapping, to obtain one or more coded bits of the communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a wireless communication device, comprising: training a bitwise autoencoder neural network to obtain a constellation mapping to be used for mapping coded bits to modulated symbols; determining a bit position ordering for bit positions of modulated symbols associated with the constellation mapping based at least in part on error protection levels of bit positions associated with the constellation mapping; performing bit interleaving for one or more coded bits of a communication, based at least in part on the bit position ordering of the constellation mapping, to obtain one or more interleaved bits; generating one or more modulated symbols for the communication by mapping the one or more interleaved bits using the constellation mapping; and transmitting, to a receiver device, the one or more modulated symbols for the communication.

Aspect 2: The method of Aspect 1, wherein training the bitwise autoencoder neural network to obtain the constellation mapping comprises: training the bitwise autoencoder neural network to obtain the constellation mapping based at least in part on at least one of: a modulation order, a code rate, an operating signal-to-noise ratio (SNR), an SNR range associated with the operating SNR, or a combination thereof.

Aspect 3: The method of any one of Aspects 1-2, wherein determining the bit position ordering for modulated symbols associated with the constellation mapping comprises: determining, for a bit position, a distance measurement between one or more pairs of constellation points in the constellation mapping for the bit position; determining, for the bit position, an error protection level for the bit position based at least in part on the distance measurement; determining, for each bit position for modulated symbols associated with the constellation mapping, an error protection level; and determining the bit position ordering based at least in part on comparing the error protection levels for each bit position.

Aspect 4: The method of Aspect 3, wherein the distance measurement is at least one of: a minimum mean squared error (MSE) for the one or more pairs of constellation points, a maximum MSE for the one or more pairs of constellation points, an average MSE for the one or more pairs of constellation points, or a combination thereof.

Aspect 5: The method of any one of Aspects 1-4, wherein determining the bit position ordering for modulated symbols associated with the constellation mapping comprises: determining to order the bit positions from a lowest error protection level to a highest error protection level or from a highest error protection level to a lowest error protection level based at least in part on a configuration of the wireless communication device.

Aspect 6: The method of any one of Aspects 1-5, further comprising: transmitting, to the receiver device, an indication of at least one of: whether the wireless communication device is to perform the bit interleaving that is based at least in part on the bit position ordering of the constellation mapping, the bit position ordering of the constellation mapping, or a combination thereof.

Aspect 7: The method of Aspect 6, wherein transmitting the indication comprises: transmitting, to the receiver device, the indication via at least one of: a control message that schedules the communication, a semi-static configuration, a demapping configuration associated with the bitwise autoencoder neural network, an indication of a bitwise autoencoder neural network for the receiver device, or a combination thereof.

Aspect 8: The method of any one of Aspects 1-7, wherein performing the bit interleaving for the one or more coded bits of the communication comprises: determining a difference between error protection levels for each bit position for modulated symbols associated with the constellation mapping; determining whether the difference satisfies a threshold; and performing the bit interleaving for the one or more coded bits of the communication if the difference satisfies the threshold.

Aspect 9: The method of any one of Aspects 1-8, wherein determining the bit position ordering for modulated symbols associated with the constellation mapping comprises: determining that a first error protection level for a first bit position is the same as or within a threshold amount of a second error protection level for a second bit position; and determining a bit position ordering for the first bit position and the second bit position based at least in part on a default position of the first bit position and a default position of the second bit position within modulated symbols associated with the constellation mapping.

Aspect 10: The method of any one of Aspects 1-9, wherein performing the bit interleaving for the one or more coded bits of the communication comprises: performing the bit interleaving to map a first type of coded bit of the one or more coded bits into bit positions having higher error protection levels according to the bit position ordering, wherein the first type of coded bit is associated with a greater importance for data recovery at the receiver device than a second type of coded bit.

Aspect 11: The method of Aspect 10, wherein the first type of coded bit is a systematic bit and the second type of coded bit is a parity bit.

Aspect 12: The method of any one of Aspects 1-11, wherein performing the bit interleaving for the one or more coded bits of the communication comprises: inputting the one or more coded bits into a matrix that includes one or more rows, wherein the number of one or more rows is equal to a modulation order associated with the constellation mapping; ordering the one or more rows based at least in part on the bit position ordering; and obtaining a vector of interleaved coded bits based at least in part on coded bits included each column of the matrix.

Aspect 13: The method of Aspect 1, wherein determining the bit position ordering for modulated symbols associated with the constellation mapping comprises: determining a difference between error protection levels for each bit position for modulated symbols associated with the constellation mapping; determining that the difference satisfies a modulation order threshold; and selecting an updated modulation order for the communication based at least in part on the difference satisfying the modulation order threshold, wherein the updated modulation order is a lower modulation order than a modulation order associated with the constellation mapping, wherein transmitting the one or more modulated symbols for the communication comprises: transmitting one or more modulated symbols for the communication that have the updated modulation order.

Aspect 14: An apparatus for wireless communication at a device, comprising a processor; memory coupled with the processor; and instructions stored in the memory and executable by the processor to cause the apparatus to perform the method of one or more Aspects of Aspects 1-13.

Aspect 15: A device for wireless communication, comprising a memory and one or more processors coupled to the memory, the memory and the one or more processors configured to perform the method of one or more Aspects of Aspects 1-13.

Aspect 16: An apparatus for wireless communication, comprising at least one means for performing the method of one or more Aspects of Aspects 1-13.

Aspect 17: A non-transitory computer-readable medium storing code for wireless communication, the code comprising instructions executable by a processor to perform the method of one or more Aspects of Aspects 1-13.

Aspect 18: A non-transitory computer-readable medium storing a set of instructions for wireless communication, the set of instructions comprising one or more instructions that, when executed by one or more processors of a device, cause the device to perform the method of one or more Aspects of Aspects 1-13.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
    a memory; and
    one or more processors operatively coupled to the memory, the memory and the one or more processors configured to:
        train a bitwise autoencoder neural network to obtain a constellation mapping to be used for mapping coded bits to modulated symbols;
        determine a bit position ordering for bit positions of modulated symbols associated with the constellation mapping based at least in part on error protection levels of bit positions associated with the constellation mapping;
        perform bit interleaving for one or more coded bits of a communication, based at least in part on the bit position ordering, to obtain one or more interleaved bits;
        generate one or more modulated symbols for the communication by mapping the one or more interleaved bits using the constellation mapping; and
        transmit, to a receiver device, the one or more modulated symbols for the communication.

2. The wireless communication device of claim 1, wherein the memory and the one or more processors are configured to, when training the bitwise autoencoder neural network to obtain the constellation mapping:
    train the bitwise autoencoder neural network to obtain the constellation mapping based at least in part on at least one of:
        a modulation order,
        a code rate,
        an operating signal-to-noise ratio (SNR),
        an SNR range associated with the operating SNR, or
        a combination thereof.

3. The wireless communication device of claim 1, wherein the memory and the one or more processors are configured to, when determining the bit position ordering for modulated symbols associated with the constellation mapping:
    determine, for a bit position, a distance measurement between one or more pairs of constellation points in the constellation mapping for the bit position;
    determine, for the bit position, an error protection level for the bit position based at least in part on the distance measurement;
    determine, for each bit position for modulated symbols associated with the constellation mapping, an error protection level; and
    determine the bit position ordering based at least in part on comparing the error protection levels for each bit position.

4. The wireless communication device of claim 3, wherein the distance measurement is at least one of:
    a minimum mean squared error (MSE) for the one or more pairs of constellation points,
    a maximum MSE for the one or more pairs of constellation points,
    an average MSE for the one or more pairs of constellation points, or
    a combination thereof.

5. The wireless communication device of claim 1, wherein the memory and the one or more processors are configured to, when determining the bit position ordering for modulated symbols associated with the constellation mapping:
    determine to order the bit positions from a lowest error protection level to a highest error protection level, or from a highest error protection level to a lowest error protection level, based at least in part on a configuration of the wireless communication device.

6. The wireless communication device of claim 1, wherein the memory and the one or more processors are further configured to:
    transmit, to the receiver device, an indication of at least one of:
        whether the wireless communication device is to perform the bit interleaving that is based at least in part on the bit position ordering of the constellation mapping,
        the bit position ordering of the constellation mapping, or
        a combination thereof.

7. The wireless communication device of claim 6, wherein the memory and the one or more processors are configured to, when transmitting the indication:
    transmit, to the receiver device, the indication via at least one of:
        a control message that schedules the communication,
        a semi-static configuration,
        a demapping configuration associated with the bitwise autoencoder neural network,
        an indication of a bitwise autoencoder neural network for the receiver device, or
        a combination thereof.

8. The wireless communication device of claim 1, wherein the memory and the one or more processors are configured to, when performing the bit interleaving for the one or more coded bits of the communication:
    determine a difference between error protection levels for each bit position for modulated symbols associated with the constellation mapping;
    determine whether the difference satisfies a threshold; and perform the bit interleaving for the one or more coded bits of the communication if the difference satisfies the threshold.

9. The wireless communication device of claim 1, wherein the memory and the one or more processors are configured to, when determining the bit position ordering for modulated symbols associated with the constellation mapping:
   determine that a first error protection level for a first bit position is the same as or within a threshold amount of a second error protection level for a second bit position; and
   determine a bit position ordering for the first bit position and the second bit position based at least in part on a default position of the first bit position and a default position of the second bit position within modulated symbols associated with the constellation mapping.

10. The wireless communication device of claim 1, wherein the memory and the one or more processors are configured to, when performing the bit interleaving for the one or more coded bits of the communication:
   perform the bit interleaving to map a first type of coded bit of the one or more coded bits into bit positions having higher error protection levels according to the bit position ordering, wherein the first type of coded bit is associated with a greater importance for data recovery at the receiver device than a second type of coded bit.

11. The wireless communication device of claim 10, wherein the first type of coded bit is a systematic bit and the second type of coded bit is a parity bit.

12. The wireless communication device of claim 1, wherein the memory and the one or more processors are configured to, when performing the bit interleaving for the one or more coded bits of the communication:
   input the one or more coded bits into a matrix that includes one or more rows, wherein the number of one or more rows is equal to a modulation order associated with the constellation mapping;
   order the one or more rows based at least in part on the bit position ordering; and
   obtain a vector of interleaved coded bits based at least in part on coded bits included each column of the matrix.

13. The wireless communication device of claim 1, wherein the memory and the one or more processors are configured to, when determining the bit position ordering for modulated symbols associated with the constellation mapping:
   determine a difference between error protection levels for each bit position for modulated symbols associated with the constellation mapping;
   determine that the difference satisfies a modulation order threshold; and
   select an updated modulation order for the communication based at least in part on the difference satisfying the modulation order threshold, wherein the updated modulation order is a lower modulation order than a modulation order associated with the constellation mapping,
      wherein the memory and the one or more processors are configured to, when transmitting the one or more modulated symbols for the communication:
         transmit one or more modulated symbols for the communication that have the updated modulation order.

14. A method of wireless communication performed by a wireless communication device, comprising:
   training a bitwise autoencoder neural network to obtain a constellation mapping to be used for mapping coded bits to modulated symbols;
   determining a bit position ordering for bit positions of modulated symbols associated with the constellation mapping based at least in part on error protection levels of bit positions associated with the constellation mapping;
   performing bit interleaving for one or more coded bits of a communication, based at least in part on the bit position ordering, to obtain one or more interleaved bits;
   generating one or more modulated symbols for the communication by mapping the one or more interleaved bits using the constellation mapping; and
   transmitting, to a receiver device, the one or more modulated symbols for the communication.

15. The method of claim 14, wherein training the bitwise autoencoder neural network to obtain the constellation mapping comprises:
   training the bitwise autoencoder neural network to obtain the constellation mapping based at least in part on at least one of:
      a modulation order,
      a code rate,
      an operating signal-to-noise ratio (SNR),
      an SNR range associated with the operating SNR, or
      a combination thereof.

16. The method of claim 14, wherein determining the bit position ordering for modulated symbols associated with the constellation mapping comprises:
   determining, for a bit position, a distance measurement between one or more pairs of constellation points in the constellation mapping for the bit position;
   determining, for the bit position, an error protection level for the bit position based at least in part on the distance measurement;
   determining, for each bit position for modulated symbols associated with the constellation mapping, an error protection level; and
   determining the bit position ordering based at least in part on comparing the error protection levels for each bit position.

17. The method of claim 16, wherein the distance measurement is at least one of:
   a minimum mean squared error (MSE) for the one or more pairs of constellation points,
   a maximum MSE for the one or more pairs of constellation points,
   an average MSE for the one or more pairs of constellation points, or
   a combination thereof.

18. The method of claim 14, wherein determining the bit position ordering for modulated symbols associated with the constellation mapping comprises:
   determining to order the bit positions from a lowest error protection level to a highest error protection level or from a highest error protection level to a lowest error protection level based at least in part on a configuration of the wireless communication device.

19. The method of claim 14, further comprising:
   transmitting, to the receiver device, an indication of at least one of:
      whether the wireless communication device is to perform the bit interleaving that is based at least in part on the bit position ordering of the constellation mapping, the bit position ordering of the constellation mapping, or a combination thereof.

20. The method of claim 19, wherein transmitting the indication comprises:
transmitting, to the receiver device, the indication via at least one of:
a control message that schedules the communication,
a semi-static configuration,
a demapping configuration associated with the bitwise autoencoder neural network,
an indication of a bitwise autoencoder neural network for the receiver device, or
a combination thereof.

21. The method of claim 14, wherein performing the bit interleaving for the one or more coded bits of the communication comprises:
determining a difference between error protection levels for each bit position for modulated symbols associated with the constellation mapping;
determining whether the difference satisfies a threshold; and
performing the bit interleaving for the one or more coded bits of the communication if the difference satisfies the threshold.

22. The method of claim 14, wherein determining the bit position ordering for modulated symbols associated with the constellation mapping comprises:
determining that a first error protection level for a first bit position is the same as or within a threshold amount of a second error protection level for a second bit position; and
determining a bit position ordering for the first bit position and the second bit position based at least in part on a default position of the first bit position and a default position of the second bit position within modulated symbols associated with the constellation mapping.

23. The method of claim 14, wherein performing the bit interleaving for the one or more coded bits of the communication comprises:
performing the bit interleaving to map a first type of coded bit of the one or more coded bits into bit positions having higher error protection levels according to the bit position ordering, wherein the first type of coded bit is associated with a greater importance for data recovery at the receiver device than a second type of coded bit.

24. The method of claim 23, wherein the first type of coded bit is a systematic bit and the second type of coded bit is a parity bit.

25. The method of claim 14, wherein performing the bit interleaving for the one or more coded bits of the communication comprises:
inputting the one or more coded bits into a matrix that includes one or more rows, wherein the number of one or more rows is equal to a modulation order associated with the constellation mapping;
ordering the one or more rows based at least in part on the bit position ordering; and
obtaining a vector of interleaved coded bits based at least in part on coded bits included each column of the matrix.

26. The method of claim 14, wherein determining the bit position ordering for modulated symbols associated with the constellation mapping comprises:
determining a difference between error protection levels for each bit position for modulated symbols associated with the constellation mapping;
determining that the difference satisfies a modulation order threshold; and
selecting an updated modulation order for the communication based at least in part on the difference satisfying the modulation order threshold, wherein the updated modulation order is a lower modulation order than a modulation order associated with the constellation mapping,
wherein transmitting the one or more modulated symbols for the communication comprises:
transmitting one or more modulated symbols for the communication that have the updated modulation order.

27. A non-transitory computer-readable medium storing a set of instructions for wireless communication, the set of instructions comprising:
one or more instructions that, when executed by one or more processors of a wireless communication device, cause the wireless communication device to:
train a bitwise autoencoder neural network to obtain a constellation mapping to be used for mapping coded bits to modulated symbols;
determine a bit position ordering for bit positions of modulated symbols associated with the constellation mapping based at least in part on error protection levels of bit positions associated with the constellation mapping;
perform bit interleaving for one or more coded bits of a communication, based at least in part on the bit position ordering, to obtain one or more interleaved bits;
generate one or more modulated symbols for the communication by mapping the one or more interleaved bits using the constellation mapping; and
transmit, to a receiver device, the one or more modulated symbols for the communication.

28. The non-transitory computer-readable medium of claim 27, wherein the one or more instructions, that cause the wireless communication device to perform the bit interleaving for the one or more coded bits of the communication, cause the wireless communication device to:
perform the bit interleaving to map a first type of coded bit of the one or more coded bits into bit positions having higher error protection levels according to the bit position ordering, wherein the first type of coded bit is associated with a greater importance for data recovery at the receiver device than a second type of coded bit.

29. An apparatus for wireless communication, comprising:
means for training a bitwise autoencoder neural network to obtain a constellation mapping to be used for mapping coded bits to modulated symbols;
means for determining a bit position ordering for bit positions of modulated symbols associated with the constellation mapping based at least in part on error protection levels of bit positions associated with the constellation mapping;
means for performing bit interleaving for one or more coded bits of a communication, based at least in part on the bit position ordering, to obtain one or more interleaved bits;

means for generating one or more modulated symbols for the communication by mapping the one or more interleaved bits using the constellation mapping; and means for transmitting, to a receiver device, the one or more modulated symbols for the communication.

30. The apparatus of claim 29, wherein the means for performing the bit interleaving for the one or more coded bits of the communication comprises:

means for performing the bit interleaving to map a first type of coded bit of the one or more coded bits into bit positions having higher error protection levels according to the bit position ordering, wherein the first type of coded bit is associated with a greater importance for data recovery at the receiver device than a second type of coded bit.

* * * * *